(12) United States Patent
Kobayakawa et al.

(10) Patent No.: US 12,191,684 B2
(45) Date of Patent: Jan. 7, 2025

(54) TECHNIQUE FOR CONTROLLING DISCHARGE FROM BATTERY PACK

(71) Applicant: MAKITA CORPORATION, Anjo (JP)

(72) Inventors: Tadahiko Kobayakawa, Anjo (JP); Hayato Kano, Anjo (JP); Yoshitaka Ichikawa, Anjo (JP)

(73) Assignee: MAKITA CORPORATION, Anjo (JP)

(*) Notice: Subject to any disclaimer, the term of this patent is extended or adjusted under 35 U.S.C. 154(b) by 133 days.

(21) Appl. No.: 18/126,584

(22) Filed: Mar. 27, 2023

(65) Prior Publication Data
US 2023/0318314 A1   Oct. 5, 2023

(30) Foreign Application Priority Data
Mar. 31, 2022 (JP) .................... 2022-059794

(51) Int. Cl.
| | |
|---|---|
| H02J 7/00 | (2006.01) |
| A01D 34/78 | (2006.01) |
| A01D 34/90 | (2006.01) |
| A01D 101/00 | (2006.01) |
| H01M 10/42 | (2006.01) |
| H01M 10/46 | (2006.01) |
| H01M 10/48 | (2006.01) |
| H02P 23/14 | (2006.01) |

(52) U.S. Cl.
CPC ............ *H02J 7/0013* (2013.01); *A01D 34/78* (2013.01); *H01M 10/46* (2013.01); *H01M 10/486* (2013.01); *H02J 7/00045* (2020.01); *H02J 7/0047* (2013.01); *H02J 7/0063* (2013.01); *H02J 7/007182* (2020.01); *H02J 7/007194* (2020.01); *H02P 23/14* (2013.01); *A01D 34/90* (2013.01); *A01D 2101/00* (2013.01); *H01M 2010/4278* (2013.01); *H01M 2220/30* (2013.01)

(58) Field of Classification Search
CPC ............ H01M 10/0445; H01M 10/00; H01M 10/4207; H01M 10/4214; H01M 10/4221; H01M 10/441; H01M 2/1022; H01M 2/1033; H01M 2220/30; H02J 7/00; H02J 7/0024; H02J 7/022; H02P 25/14; H02P 29/00
See application file for complete search history.

(56) References Cited

U.S. PATENT DOCUMENTS

2018/0048249 A1* 2/2018 Ikeda .................. G06F 21/44

FOREIGN PATENT DOCUMENTS

JP     2015-128080 A     7/2015

* cited by examiner

*Primary Examiner* — Said Bouziane
(74) *Attorney, Agent, or Firm* — Oliff PLC

(57) ABSTRACT

A system in one aspect of the present disclosure includes a battery pack and an electric work machine. The battery pack includes a battery, a first interface, a first memory and a first controller. The first controller is configured to transmit battery data identifying a type of the battery pack. The electric work machine includes a motor, a second interface, a switching element, a manual switch, a second memory and a second controller. The second controller is configured to transmit electric apparatus data identifying a type of the electric work machine.

16 Claims, 12 Drawing Sheets

TECHNIQUE FOR CONTROLLING DISCHARGE FROM BATTERY PACK

CROSS-REFERENCE TO RELATED APPLICATIONS

The present application claims the benefit of Japanese patent application No. 2022-059794 filed with the Japan Patent Office on Mar. 31, 2022 and the entire disclosure of which is incorporated herein by reference.

BACKGROUND

The present disclosure relates to a system including a battery pack and an electric work machine.

The electric power tool system disclosed in Japanese Laid-Open Patent Application No. 2015-128080 includes a battery pack and an electric work machine. In the case where the electric work machine is incompatible with the battery pack, a first connector of the electric work machine has a shape that cannot be attached to a second connector of the battery pack. In the case where the electric work machine is compatible with the battery pack, the first connector of the electric work machine has a shape that can be attached to the second connector of the battery pack.

SUMMARY

There are some limitations to the shapes of the first and second connector due to the structures of the battery pack and the electric work machine. Thus, sometimes it is difficult to change the shape of the second connector of a new battery pack from the one corresponding to the shape of the first connector of an existing electric work machine. This may result in difficulties in inhibiting a discharge from the new battery pack to the existing electric work machine.

Similarly, sometimes it is difficult to change the shape of the first connector of a new electric work machine from the one corresponding to the shape of the second connector of an existing battery pack. This may result in difficulties in inhibiting the discharge from the existing battery pack to the new electric work machine.

In one aspect of the present disclosure, it is desirable to inhibit the discharge from the new battery pack to the existing electric work machine, and from the existing battery pack to the new electric work machine.

A system in one aspect of the present disclosure includes a battery pack and an electric work machine. The battery pack includes a battery, a first interface, a first memory and a first controller. The first interface (i) includes a first positive terminal, a first negative terminal, and a first communication terminal and (ii) is configured to be alternatively connected to a first type electric apparatus or a second type electric apparatus. The first memory stores first data and/or second data. The first data identifies the first type electric apparatus. The second data identifies the second type electric apparatus. The first type electric apparatus is compatible with the battery pack. The second type electric apparatus is incompatible with the battery pack.

The first controller transmits battery data from the first communication terminal. The battery data identifies a type of the battery pack. The first controller receives electric apparatus data from the first communication terminal. The electric apparatus data identifies a type of an electric apparatus connected to the first interface. The first controller transmits a permission signal from the first communication terminal at least based on (i) the first data including the type of the electric apparatus identified by the electric apparatus data, or (ii) the second data excluding the type of the electric apparatus identified by the electric apparatus data. The permission signal allows the electrical apparatus connected to the first interface to receive a discharge from the battery. The first controller transmits a prohibition signal from the first communication terminal based on (i) the first data excluding the type of the electric apparatus identified by the electric apparatus data, or (ii) the second data including the type of the electric apparatus identified by the electric apparatus data. The prohibition signal forbids the electric apparatus connected to the first interface to receive the discharge from the battery.

The electric work machine includes a motor, a second interface, a current path, a switching element, a manual switch, a second memory, and a second controller. The motor receives an electric power to thereby rotate. The second interface (i) includes a second positive terminal, a second negative terminal, and a second communication terminal, and (ii) is connected to the first interface. The current path electrically connects the second positive terminal or the second negative terminal to the motor. The switching element is on the current path. The manual switch is manually operated by a user. The second memory stores third data and/or fourth data. The third data identifies a first type battery pack. The fourth data identifies a second type battery pack. The first type battery pack is compatible with the electric work machine. The second type battery pack is incompatible with the electric work machine.

The second controller transmits the electric apparatus data from the second communication terminal. The second controller receives the battery data from the second communication terminal. The second controller determines to allow the battery pack connected to the second interface to discharge to the electric work machine based on (i) the third data including the type of the battery pack identified by the battery data, or (ii) the fourth data excluding the type of the battery pack identified by the battery data. The second controller turns on the switching element based on (i) the second controller having determined to allow the discharge, and (ii) the second controller having received the permission signal from the second communication terminal, and (iii) the manual switch having been or being manually operated. The second controller turns off the switching element based on (i) the second controller having not determined to allow the discharge or (ii) the second controller having received the prohibition signal from the second communication terminal.

The battery pack included in the above-described system can recognize whether the electric apparatus connected to the first interface is an electric work machine compatible with the battery pack by checking the received electric apparatus data against data in the first memory. If the electric apparatus connected to the first interface is the electric work machine incompatible with the battery pack, the battery pack can forbid the discharge from the battery pack. The electric work machine included in the above-described system can recognize whether the battery pack connected to the second interface is compatible with the electric work machine by checking the received battery data against data in the second memory. If the battery pack connected to the second interface is incompatible with the electric work machine, the electric work machine can turn off the switching element and forbid the discharge to the electric work machine. Thus, the above-described system makes it possible to inhibit the discharge from the new battery pack to the existing electric work machine, and from the existing battery pack to the new electric work machine.

A battery pack in another aspect of the present disclosure includes a battery, an interface, a memory, and a controller. The interface (i) includes a positive terminal, a negative terminal, and a communication terminal and (ii) is alternatively connected to a first type electric apparatus or a second type electric apparatus. The memory stores first data and/or second data. The first data identifies the first type electric apparatus. The second data identifies the second type electric apparatus. The first type electric apparatus is compatible with the battery pack. The second type electric apparatus is incompatible with the battery pack.

The controller transmits battery data from the communication terminal. The battery data identifies a type of the battery pack. The controller receives a work machine data from the communication terminal. The work machine data identifies a type of an electric work machine connected to the interface. The controller transmits a permission signal from the communication terminal at least based on (i) first data including the type of the electric work machine identified by the work machine data, or (ii) second data excluding the type of the electric work machine identified by the work machine data. The permission signal allows the electric work machine connected to the interface to receive a discharge from the battery. The controller transmits a prohibition signal from the communication terminal based on (i) the first data excluding the type of the electric work machine identified by the work machine data, or (ii) the second data including the type of the electric work machine identified by the work machine data. The prohibition signal forbids the electric work machine connected to the interface to receive the discharge from the battery.

By connecting the above-described battery pack to the electric work machine, effects similar to those of the above-described system can be exhibited.

An electric work machine in still another aspect of the present disclosure includes an interface, a motor, a switching element, a current path, a manual switch, a memory, and a controller. The interface (i) includes a positive terminal, a negative terminal, and a communication terminal, and (ii) is alternatively connected to a first type battery pack or a second type battery pack. The motor receives an electric power to thereby rotate. The current path is electrically connect the positive terminal or the negative terminal to the motor. The switching element is on the current path. The manual switch is manually operated by a user. The memory stores first data and/or second data. The first data identifies a first type battery pack. The second data identifies a second type battery pack. The first type battery pack is compatible with the electric work machine. The second type battery pack is incompatible with the electric work machine.

The controller transmits work machine data from the communication terminal. The work machine data identifies a type of the electric work machine. The controller receives battery data from the communication terminal. The battery data identifies a type of a battery pack connected to the interface. The controller determines to allow the battery pack connected to the interface to discharge to the electric work machine based on (i) first data including the type of the battery pack identified by the battery data, or (ii) second data excluding the type of the battery pack identified by the battery data. The controller turns on the switching element based on (i) the controller having determined to allow a discharge, and (ii) the controller having received a permission signal from the communication terminal, and (iii) the manual switch having been or being manually operated. The permission signal is transmitted from the battery pack connected to the interface in response to the battery pack allowing the discharge. The controller turns off the switching element based on (i) the controller having not determined to allow the discharge or (ii) the controller having received a prohibition signal from the communication terminal. The prohibition signal is transmitted from the battery pack connected to the interface in response to the battery pack forbidding the discharge.

By connecting the above-described electric work machine to the battery pack, effects similar to those of the above-described system can be exhibited.

A method in still another aspect of the present disclosure includes: transmitting battery data to an electric work machine, the battery data identifying a type of a battery pack;
  receiving work machine data from the electric work machine, the work machine data identifying a type of the electric work machine;
  transmitting a permission signal to the electric work machine at least based on (i) first data including the type of the electric work machine identified by the work machine data, or (ii) second data excluding the type of the electric work machine identified by the work machine data, the first data identifying a first type electric work machine, the second data identifying a second type electric work machine, the first type electric work machine being compatible with the battery pack, the second type electric work machine being incompatible with the battery pack, the permission signal allowing the electric work machine to receive a discharge from the battery pack; and
  transmitting a prohibition signal to the electric work machine based on (i) the first data excluding the type of the electric work machine identified by the work machine data, or (ii) the second data including the type of the electric work machine identified by the work machine data, the prohibition signal forbidding the electric work machine to receive the discharge from the battery pack.

The implementation of the above-described method makes it possible to exhibit effects similar to those exhibited by the above-described battery pack.

A method in still another aspect of the present disclosure includes: transmitting work machine data to a battery pack, the work machine data identifying a type of an electric work machine;
  receiving battery data from the battery pack, the battery data identifying a type of the battery pack;
  determining to allow the battery pack to discharge to the electric work machine based on (i) first data including the type of the battery pack identified by the battery data, or (ii) second data excluding the type of the battery pack identified by the battery data, the first data identifying a first type battery pack, the second data identifying a second type battery pack, the first type battery pack being compatible with the electric work machine, the second type battery pack being incompatible with the electric work machine;
  turning on a switching element on a current path of the electric work machine based on (i) having determined to allow a discharge, and (ii) the electric work machine having received a permission signal from the battery pack, and (iii) a manual switch of the electric work machine having been or being manually operated by a user, the permission signal being transmitted from the battery pack in response to the battery pack allowing the discharge; and turning off the switching element based on (i) having not determined to allow the discharge, or (ii) having received a prohibition signal from the battery pack, the prohibition signal being transmitted from the battery pack in response to the battery pack forbidding the discharge.

The implementation of the above method makes it possible to achieve effects similar to those exhibited by the electric work machine.

BRIEF DESCRIPTION OF THE DRAWINGS

Some embodiments of the present disclosure are described hereinafter by way of example with reference to the accompanying drawings, in which.

DETAILED DESCRIPTION OF EXEMPLARY EMBODIMENTS

Overview of Embodiments

Figure 1:
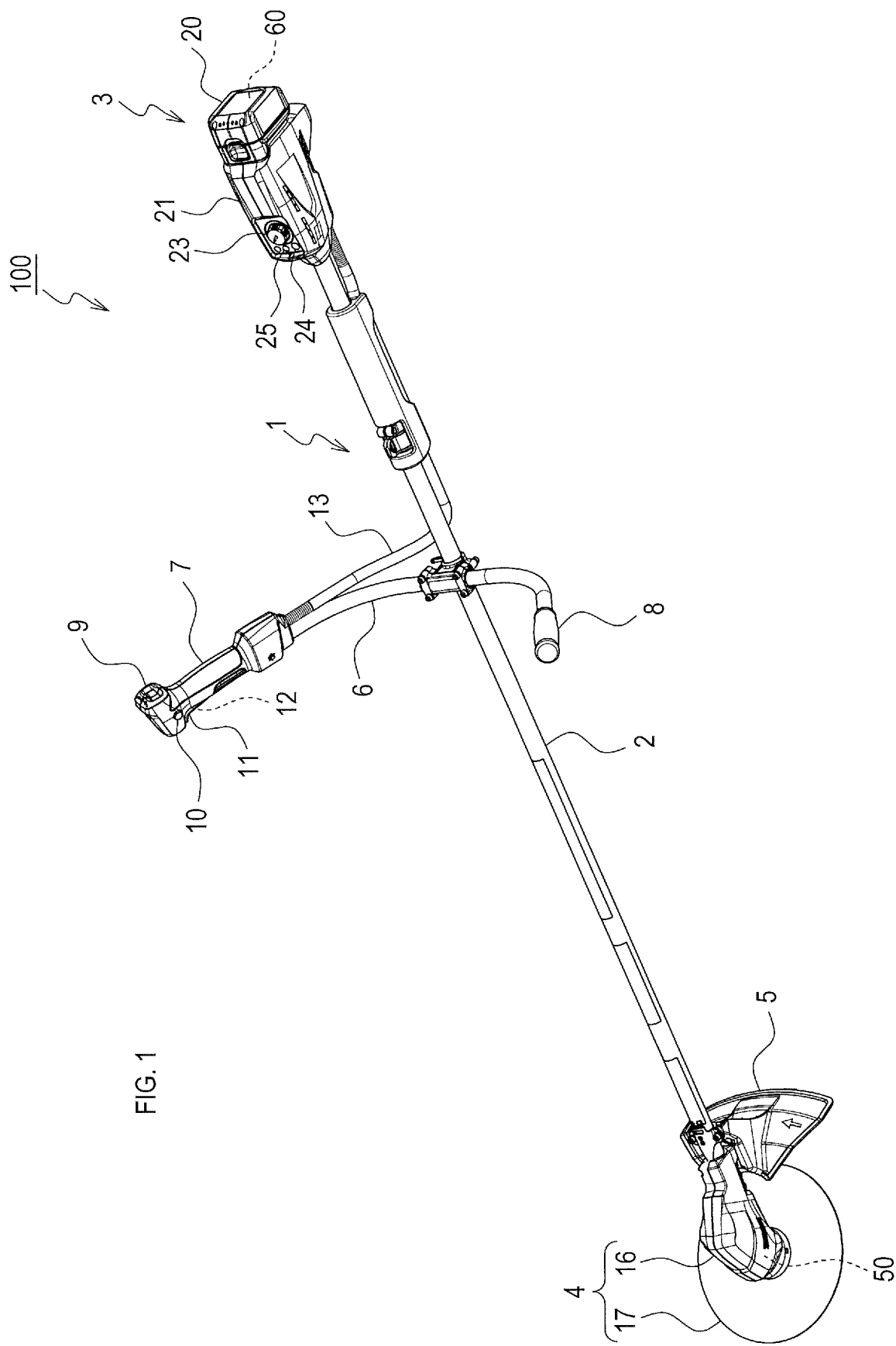
FIG. 1 is a perspective view showing an outer appearance of an electric work machine system according to a first embodiment.

In one embodiment, a system may include a battery pack and/or an electric work machine. The battery pack may include a battery, a first interface, a first memory, and/or a first controller. The first interface (i) may include a first positive terminal, a first negative terminal, and a first communication terminal and (ii) may be alternatively connected to a first type electric apparatus and a second type electric apparatus. The first memory may store first data and/or second data. The first data may identify the first type electric apparatus. The second data may identify the second type electric apparatus. The first type electric apparatus may be compatible with the battery pack. The second type electric apparatus may be incompatible with the battery pack.

The first controller may transmit battery data from the first communication terminal. The battery data may identify a type of the battery pack. The first controller may receive electric apparatus data from the first communication terminal. The electric apparatus data may identify a type of an electric apparatus connected to the first interface. The first controller may transmit a permission signal from the first communication terminal at least based on (i) the first data including the type of the electric apparatus identified by the electric apparatus data, or (ii) the second data excluding the type of the electric apparatus identified by the electric apparatus data. The permission signal may allow the electric apparatus connected to the first interface to receive a discharge from the battery. The first controller may transmit a prohibition signal from the first communication terminal based on (i) the first data excluding the type of the electric apparatus identified by the electric apparatus data, or (ii) the second data including the type of the electric apparatus identified by the electric apparatus data. The prohibition signal may forbid the electric apparatus connected to the first interface to receive the discharge from the battery.

The electric work machine may include a motor, a second interface, a current path, a switching element, a manual switch, a second memory, and/or a second controller. The motor may receive an electric power to thereby rotate. The second interface (i) may include a second positive terminal, a second negative terminal, and a second communication terminal and (ii) may be connected to the first interface. The current path may electrically connect the second positive terminal or the second negative terminal to the motor. The switching element may be on the current path. The manual switch may be manually operated by a user. The second memory may store third data and/or fourth data. The third data may identify a first type battery pack. The fourth data may identify a second type battery pack. The first type battery pack may be compatible with the electric work machine. The second type battery pack may be incompatible with the electric work machine.

The second controller may transmit the electric apparatus data from the second communication terminal. The second controller may receive the battery data from the second communication terminal. The second controller may determine to allow the battery pack connected to the second interface to discharge to the electric work machine based on (i) the third data including the type of the battery pack identified by the battery data, or (ii) the fourth data excluding the type of the battery pack identified by the battery data. The second controller may turn on the switching element based on (i) the second controller having determined to allow the discharge, and (ii) the second controller having received the permission signal from the second communication terminal, and (iii) the manual switch having been or being manually operated. The second controller may turn off the switching element based on (i) the second controller having not determined to allow the discharge or (ii) the second controller having received the prohibition signal from the second communication terminal.

In one embodiment, the first memory may store the second data.

The second data does not include the type of a new electric work machine that appears after the storage of the second data in the first memory. The battery pack may output the permission signal to the new electric work machine based on the absence, in the second data, of the type of the electric apparatus identified by the electric apparatus data. However, if the new electric work machine is incompatible with the battery pack, the new electric work machine does not determine to allow the battery pack to discharge to the electric work machine. Therefore, in the case where the first memory stores the second data and the new electric work machine is incompatible with the existing battery pack, the new electric work machine can inhibit the discharge from the existing battery pack to itself.

In one embodiment, the second memory may store the fourth data.

The fourth data does not include the type of a new battery pack that appears after the storage of the fourth data in the second memory. The electric work machine may determine to allow the new battery pack to discharge to the electric work machine based on an absence, in the fourth data, of the type of the battery pack identified by the battery data. However, if the new battery pack is incompatible with the electric work machine, the new battery pack outputs the prohibition signal to the electric work machine. Therefore, in the case where the second memory stores the fourth data and the new battery pack is incompatible with the existing electric work machine, the new battery pack can inhibit the discharge from itself to the existing electric work machine.

In one embodiment, the second memory may store the third data.

The third data does not include the type of a new battery pack that appears after the storage of the third data in the second memory. The electric work machine does not determine to allow the battery pack to discharge to the electric work machine based on the absence, in the third data, of the type of the battery pack identified by the battery data. Therefore, the existing electric work machine can inhibit the discharge from the new battery pack to the existing electric work machine.

In one embodiment, when the second memory stores the third data, the second controller may transmit a first request signal from the second communication terminal based on the third data including the type of the battery pack identified by the battery data. The first request signal may request the battery pack connected to the second interface to allow the discharge. The first controller may transmit the permission signal from the first communication terminal based on the first controller having received the first request signal from the first communication terminal.

If a new electric work machine is connected to the battery pack, the battery pack cannot determine whether the new electric work machine is compatible therewith. However, the new electric work machine can determine whether the battery pack is compatible therewith based on the third data including the type of the battery pack identified by the battery data. Therefore, even if the first data does not include the type of the electric apparatus identified by electric apparatus data, the battery pack transmits the permission signal to the electric work machine at least based on the receipt of the first request signal from the electric work machine. This makes it possible for the new electric work machine to use the existing battery pack.

In one embodiment, the first memory may store the first data.

The first data does not include the type of a new electric work machine that appears after the storage of the first data in the first memory. The battery pack outputs the prohibition signal to the new electric work machine based on the absence, in the first data, of the type of the electric apparatus identified by electric apparatus data. Thus, the existing battery pack can inhibit the discharge from the existing battery pack to the new electric work machine.

In one embodiment, when the first memory stores the first data, the first controller may transmit a second request signal from the first communication terminal based on the first data including the type of the electric apparatus identified by the electric apparatus data. The second request signal may request the electric apparatus connected to the first interface to allow the discharge. The second controller may determine to allow the discharge based on the second controller having received the second request signal from the second communication terminal.

If the electric work machine is connected to a new battery pack, the electric work machine cannot determine whether the new battery pack is compatible therewith. However, the new battery pack can determine whether the electric work machine is compatible therewith based on the first data including the type of the electric apparatus identified by the electric apparatus data. Therefore, even if the third data does not include the type of the battery pack identified by the battery data, the electric work machine can determine to allow the discharge from the battery pack at least based on the receipt of the second request signal from the battery pack. This makes it possible for the existing electric work machine to use the new battery pack.

In one embodiment, the battery pack may further include a voltage detector and/or a temperature detector. The voltage detector may detect a battery voltage value. The battery voltage value may correspond to a magnitude of an output voltage of the battery. The temperature detector may detect a battery temperature. The first controller may determine whether the battery is dischargeable based on the battery voltage value detected by the voltage detector and/or the battery temperature detected by the temperature detector. The first controller may transmit the permission signal from the first communication terminal based on (i) the first data including the type of the electric apparatus identified by the electric apparatus data, or (ii) the second data excluding the type of the electric apparatus identified by the electric apparatus data, and (iii) the first controller having determined that the battery is dischargeable.

The battery pack can allow the discharge from the battery pack to the electric work machine on the basis that the electric apparatus connected to the first interface is compatible therewith and the battery is dischargeable.

In one embodiment, a battery pack may be provided. The battery pack may include a battery, an interface, a memory, and/or a controller. The interface (i) may include a positive terminal, a negative terminal, and a communication terminal and (ii) may be alternatively connected to a first type electric work machine or a second type electric work machine. The memory may store first data and/or second data. The first data may identify the first type electric work machine. The second data may identify the second type electric work machine. The first type electric work machine may be compatible with the battery pack. The second type electric work machine may be incompatible with the battery pack. The controller may transmit battery data from the communication terminal. The battery data may identify a type of the battery pack. The controller may receive work machine data from the communication terminal. The work machine data may identify a type of an electric work machine connected to the interface. The controller may transmit a permission signal from the communication terminal at least based on (i) the first data including the type of the electric work machine identified by the work machine data, or (ii) the second data excluding the type of the electric work machine identified by the work machine data. The permission signal may allow the electric work machine connected to the interface to receive a discharge from the battery. The controller may transmit a prohibition signal from the communication terminal based on (i) the first data excluding the type of the electric work machine identified by the work machine data, or (ii) the second data including the type of the electric work machine identified by the work machine data. The prohibition signal may forbid the electric work machine connected to the interface to receive the discharge from the battery.

By connecting the above-described battery pack to the electric work machine, effects similar to those of the above-described system can be exhibited.

In the battery pack of one embodiment, the memory may store the second data.

In the battery pack of one embodiment, the memory may store the first data.

In the battery pack of one embodiment, when the memory stores the first data, the controller may transmit a request signal from the communication terminal based on the first data including the type of the electric work machine identified by the work machine data. The request signal may request the electric work machine connected to the interface to allow the discharge.

In the case where the above described battery pack is a new battery pack and connected to the existing electric work machine, the existing electric work machine can use the new battery pack.

In one embodiment, an electric work machine may be provided. The electric work machine may include an interface, a motor, a current path, a switching element, a manual switch, a memory, and/or a controller. The interface (i) may include a positive terminal, a negative terminal, and a communication terminal, and (ii) may be alternatively connected to a first type battery pack or a second type battery pack. The motor may receive an electric power to thereby rotate. The current path may electrically connect the positive terminal or the negative terminal to the motor. The switching element may be on the current path. The manual switch may be manually operated by a user. The memory may store first data and/or second data. The first data may identify a first type battery pack. The second data may identify a second type battery pack. The first type battery pack may be compatible with the electric work machine. The second type battery pack may be incompatible with the electric work machine. The controller may transmit work machine data from the communication terminal. The work machine data may identify a type of the electric work machine. The controller may receive battery data from the communication terminal. The battery data may identify a type of a battery pack connected to the interface. The controller may determine to allow the battery pack connected to the interface to discharge to the electric work machine based on (i) the first data including the type of the battery pack identified by the battery data or (ii) the second data excluding the type of the battery pack identified by the battery data. The controller may turn on the switching element based on (i) the controller having determined to allow a discharge, and (ii) the controller having received a permission signal from the communication terminal, and (iii) the manual switch having been or being manually operated. The permission signal may be transmitted from the battery pack connected to the interface in response to the battery pack allowing the discharge. The controller may turn off the switching element based on (i) the controller having not determined to allow the discharge or (ii) the controller having received a prohibition signal from the communication terminal. The prohibition signal may be transmitted from the battery pack connected to the interface in response to the battery pack forbidding the discharge.

By connecting the above-described electric work machine to the battery pack, effects similar to those of the above-described system can be exhibited.

In the electric work machine of one embodiment, the memory may store the second data.

In the electric work machine of one embodiment, the memory may store the first data.

In the electric work machine of one embodiment, when the memory stores the first data, the controller may transmit a request signal from the communication terminal based on the first data including the type of the battery pack identified by the battery data. The request signal may request the battery pack connected to the interface to allow the discharge.

In the case where the above described electric work machine is the new electric work machine and connected to the existing battery pack, the new electric work machine can use the existing battery pack.

In one embodiment, a method may be provided. The method may include transmitting battery data to an electric work machine, the battery data identifying a type of a battery pack,
  receiving work machine data from the electric work machine, the work machine data identifying a type of the electric work machine,
  transmitting a permission signal to the electric work machine at least based on (i) first data including the type of the electric work machine identified by the work machine data, or (ii) second data excluding the type of the electric work machine identified by the work machine data, the first data identifying a first type electric work machine, the second data identifying a second type electric work machine, the first type electric work machine being compatible with the battery pack, the second type electric work machine being incompatible with the battery pack, the permission signal allowing the electric work machine to receive a discharge from the battery pack, and
  transmitting a prohibition signal to the electric work machine based on (i) the first data excluding the type of the electric work machine identified by the work machine data, or (ii) the second data including the type of the electric work machine identified by the work machine data, the prohibition signal forbidding the electric work machine to receive the discharge from the battery pack.

Execution of the above-described method exhibits effects similar to those exhibited by the above-described battery pack.

In one embodiment, another method may be provided. The method may include transmitting work machine data to a battery pack, the work machine data identifying a type of an electric work machine,
  receiving battery data from the battery pack, the battery data identifying a type of the battery pack,
  determining to allow the battery pack to discharge to the electric work machine based on (i) first data including the type of the battery pack identified by the battery data, or (ii) second data excluding the type of the battery pack identified by the battery data, the first data identifying a first type battery pack, the second data identifying a second type battery pack, the first type battery pack being compatible with the electric work machine, the second type battery pack being incompatible with the electric work machine, turning on a switching element on a current path of the electric work machine based on (i) having determined to allow a discharge, and (ii) having received a permission signal from the battery pack, and (iii) a manual switch of the electric work machine having been or being manually operated by a user, the permission signal being transmitted from the battery pack in response to the battery pack allowing the discharge, and turning off the switching element based on (i) having not determined to allow the discharge, or (ii) having received a prohibition signal from the battery pack, the prohibition signal being transmitted from the battery pack in response to the battery pack forbidding the discharge.

The implementation of the above method makes it possible to achieve the same effects as the electric work machine described above.

In one embodiment, the above-described features may be combined in any way. In one embodiment, any of the above-described feature may be deleted.

SPECIFIC EXAMPLE EMBODIMENTS

First Embodiment

<1-1. Configuration>
<1-1-1. Overall Configuration>

FIG. 1 shows an electric work machine system 100 of an example embodiment of the present disclosure. The electric work machine system 100 includes an electric work machine 1 and a battery pack 20.

The electric work machine 1 of this embodiment is a grass mower. The electric work machine 1 includes a main pipe 2. The main pipe 2 is formed into a long, hollow bar-shape. The electric work machine 1 includes a drive unit 4. The drive unit 4 is arranged in the front end of the main pipe 2. The drive unit 4 includes a motor housing 16. The motor housing 16 houses a motor 50 (see FIG. 2). The motor 50 is a three-phase brushless motor. The motor housing 16 includes a rotation detection sensor 52. The rotation detection sensor 52 is configured to detect a position of a rotor of the motor 50 and output a detection signal indicating the position of the rotor to a second control circuit 36 described below.

The drive unit 4 includes a cutting blade 17. The cutting blade 17 is a disc-shaped blade to mow a target. The target for mowing may include grass and small diameter trees. The cutting blade 17 rotates by a rotational force generated by the motor 50.

The electric work machine 1 includes a cover 5. The cover 5 is arranged near the front end of the main pipe 2. The cover 5 inhibits the grass mowed by the cutting blade 17 from flying towards a user of the electric work machine 1.

The electric work machine 1 includes a handle 6. The handle 6 is formed into a U-shape, and connected to the main pipe 2 near the middle of the main pipe 2 in a length direction. The handle 6 includes a right grip 7 arranged on the right and a left grip 8 arranged on the left. The right grip 7 is held by the right hand of the user. The left grip 8 is held by the left hand of the user.

The right grip 7 includes a forward/reverse changeover switch 9 in the leading end thereof. The forward/reverse changeover switch 9 is manually operated by the user to switch a rotation direction of the motor 50. In response to the user manually operating the forward/reverse changeover switch 9, the forward/reverse changeover switch 9 outputs a switching signal. The switching signal changes the rotation direction of the motor 50 from a forward rotation to a reverse rotation, or from the reverse rotation to the forward rotation. In response to the rotation direction of the motor 50 being switched, the rotation direction of the cutting blade 17 is also switched.

The right grip 7 includes a trigger 11 in the leading end thereof. The trigger 11 is manually operated by the user to command the rotation or stop of the motor 50. The right grip 7 includes a trigger switch 12 inside thereof configured to operate in conjunction with the trigger 11. The trigger switch 12 is configured to output a trigger signal TS indicating an ON state in response to the user pulling the trigger 11. The trigger switch 12 is configured to output the trigger signal TS indicating an OFF state in response to the user releasing the trigger 11.

The right grip 7 includes a lock-off button 10 in the leading end thereof. The lock-off button 10 is manually operated by the user to inhibit a malfunction of the cutting blade 17. When the lock-off button 10 is not pushed down, the lock-off button 10 is mechanically engaged with the trigger 11. This restricts the movement of the trigger 11, preventing or inhibiting the trigger switch 12 from being turned on. When the lock-off button 10 is pushed down, the engagement of the lock-off button 10 and the trigger 11 is released.

The electric work machine 1 includes a control unit 3. The control unit 3 is arranged in the rear end of the main pipe 2. The control unit 3 includes a rear end housing 21. To the rear end housing 21, a battery pack 20 is attached.

The rear end housing 21 includes a speed change dial 23 in the front end thereof. The speed change dial 23 is manually operated by the user to change the rotational speed of the motor 50. The rear end housing 21 includes a main switch 24 in the front end thereof. The main switch 24 is manually operated by the user to start a power feed from the battery pack 20 to the motor 50. In response to the main switch 24 being turned on, a first current path 551 and a second current path 552 described below are established. In response to the main switch 24 being turned off, the first current path 551 or the second current path 552 are interrupted.

The rear end housing 21 furthermore includes a user-visible indicator 25 in the front end thereof. The indicator 25 includes a pilot light, a remaining energy pilot lamp, and a reverse direction pilot lamp. The indicator 25 informs the user of an operation state of the motor 50 and a faulty state (e.g. failure, or defect, or fault, or improper state) of the electric work machine 1. The pilot light is turned on when the main switch 24 is turned on and the power is fed to each part of the electric work machine 1. The remaining energy pilot lamp indicates the remaining capacity of a battery 60. The reverse direction pilot lamp turns on when the motor 50 rotates in the reverse direction. Note that the remaining energy is the electric power remaining in the battery 60.

The electric work machine 1 includes a control wiring pipe 13. The control wiring pipe 13 is formed into a hollow bar shape. The control wiring pipe 13 includes a control harness inside thereof. The control harness electrically connects the trigger switch 12 and the forward/reverse changeover switch 9 to the control unit 3.

The battery pack 20 is detachably attached to the rear end of the rear end housing 21.

<1-1-2. Electrical Configuration>

Figure 2:
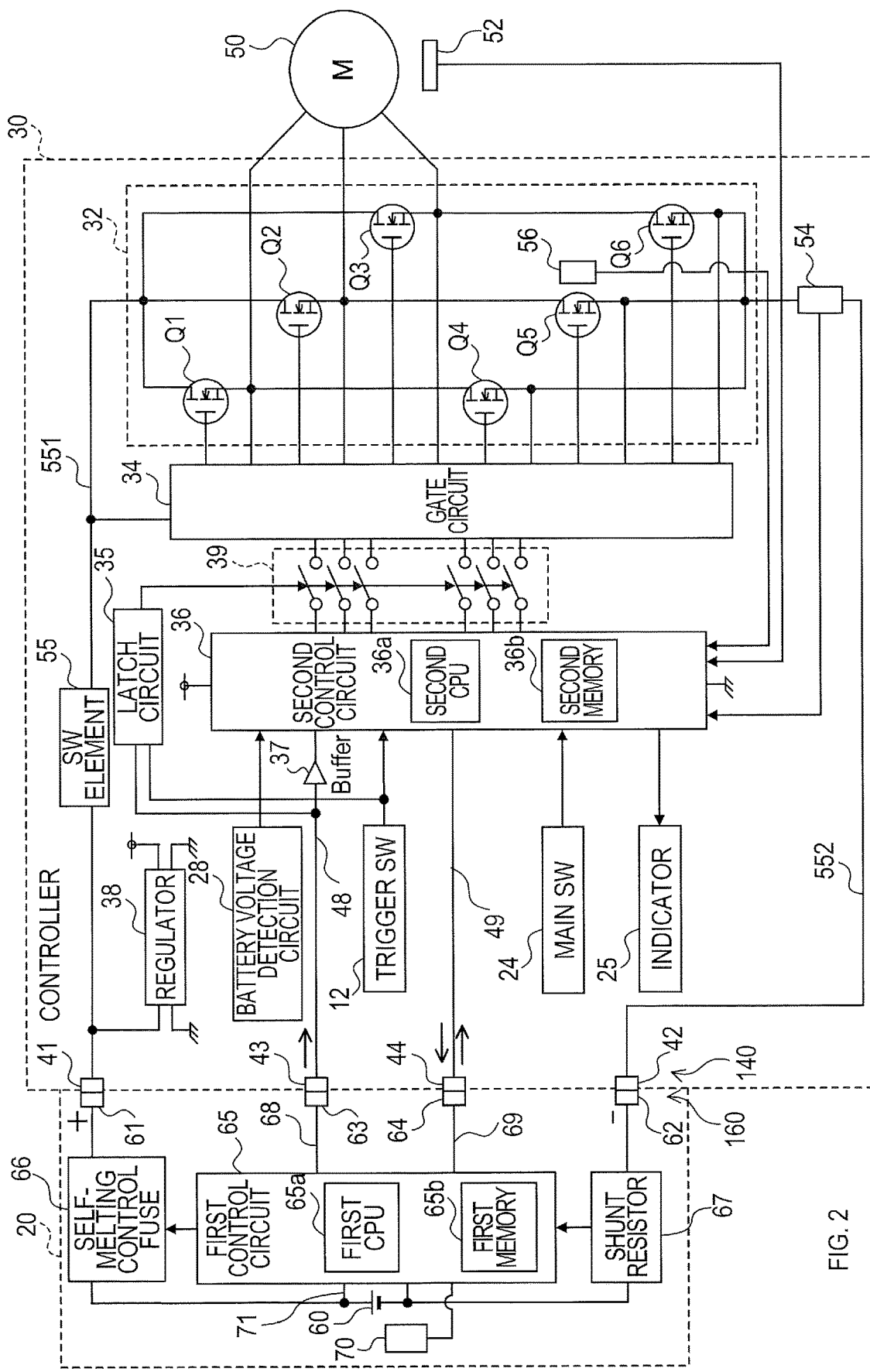
FIG. 2 is a block diagram showing an electrical configuration of the electric work machine system according to the first embodiment.

Next, the electrical configuration of the electric work machine system 100 is described with reference to FIG. 2.

The battery pack 20 includes the battery 60. The battery 60 includes serially-connected multiple battery cells. The battery 60 can be repeatedly charged and discharged. The battery 60 may be a lithium ion rechargeable battery, for example.

The battery pack 20 includes a first control circuit 65. The first control circuit 65 is embodied in the form of a microcomputer including a first CPU 65a, a first memory 65b, and an I/O. The first control circuit 65 performs a discharge control process and the like described below by the first CPU 65a executing a program stored in the first memory 65b. The first control circuit 65 corresponds to one example of a first controller of the present disclosure.

The first memory 65b stores first data and/or second data. The first data includes identification information to identify at least one compatible work machine. The second data includes identification information to identify at least one incompatible work machine. The compatible work machine corresponds to an electric work machine suitable for the battery pack 20, and the incompatible work machine corresponds to an electric work machine unsuitable for the battery pack 20.

The battery pack 20 has properties including a rated voltage Va and a maximum output Pa. For example, the incompatible work machine has properties including the rated voltage Va and a required output Pb (>Pa). If the incompatible work machine is attached to the battery pack 20, an electric current with a magnitude of greater than a first upper limit may flow from the battery pack 20. The first upper limit corresponds to a maximum current allowable for the battery pack 20. Thus, if the incompatible work machine is connected to the battery pack 20, the battery pack 20 should desirably forbid the discharge.

The compatible work machine has properties including the rated voltage Va and a required output Pc (≤Pa). Thus, if the compatible work machine is connected to the battery pack 20, an electric current with a magnitude of the first upper limit or less flows from the battery pack 20. Thus, the compatible work machine is allowed to receive the electric power from the battery pack 20. On the other hand, the incompatible work machine is forbidden to receive the electric power from the battery pack 20.

When the battery pack 20 is designed, produced or placed on the market, it has been known which existing electric work machines are compatible or incompatible with the battery pack 20. Thus, the battery pack 20 includes the first memory 65b storing the first data and/or the second data. The first memory 65b may be configured to update the first data and/or the second data through a service base and/or the Internet. In this embodiment, the first memory 65b stores the first data.

Examples of the identification information may include a work machine model name, model number, product name, load range, group, and generation of the electric work machine. For example, the work machine model name and the model number may be a string consisting of alphabets and numbers. Examples of the product name may include an impact driver, a grinder, a grass mower, a hedge trimmer, and a light. The load range is a range of load of work to be done by the electric work machine, and more specifically, examples thereof may include a heavy load, a medium load, and a light load. Examples of the group may include an electric power tool (e.g., a grinder, and a circular saw) and a gardening tool (e.g., a grass mower and a hedge trimmer). Examples of the generation may include a first generation and a second generation. In this embodiment, the first data includes the work machine model names of the compatible work machines as the identification information.

In response to the battery pack 20 being connected to the electric work machine 1, the first control circuit 65 transmits battery data through a first TR terminal 64 described below. The battery data includes information about the battery pack 20. Specifically, the battery data includes the identification information of the battery pack 20. In this embodiment, the battery data includes the pack model name of the battery pack 20. In response to the battery pack 20 being connected to the electric work machine 1, the first control circuit 65 receives work machine data through the first TR terminal 64 described below. The work machine data includes information about the electric work machine 1. Specifically, the work machine data includes the identification information of the electric work machine 1. In this embodiment, the work machine data includes the work machine model name of the electric work machine 1.

Furthermore, if the first data includes the received work machine data, the first control circuit 65 transmits a second request signal to the electric work machine 1 through the first TR terminal 64. The second request signal requests the electric work machine 1 to allow the discharge. The discharge corresponds to the supply of electric power from the battery pack 20 (i.e., battery 60) to the electric work machine 1.

The battery pack 20 includes a first interface 160 configured to be connected to the electric work machine 1. The first interface 160 includes a first positive terminal 61. The first positive terminal 61 is connected to the positive electrode of the battery 60 through a fuse having a self-melting control fuse 66 (hereinafter, simply referred to as "fuse"). The first interface 160 includes a first negative terminal 62. The first negative terminal 62 is connected to the negative electrode of the battery 60 through a shunt resistor 67.

The first interface 160 includes a first discharge stop terminal 63 (hereinafter, referred to as "first DS terminal"). The first DS terminal 63 is connected to the first control circuit 65 through a first battery connection line 68. The first DS terminal 63 is a dedicated terminal to transmit a first signal from the battery pack 20. The first signal is a signal that does not follow a communication protocol.

The first interface 160 includes first transmit and receive terminal 64 (hereinafter, referred to as "first TR terminal"). The first TR terminal 64 is connected to the first control circuit 65 through a second battery connection line 69. The first TR terminal 64 is a serial communication terminal to transmit multiple battery signals by a serial communication. The multiple battery signals include a second signal that follows the communication protocol. In this embodiment, the first DS terminal 63 and/or the first TR terminal 64 corresponds to one example of a first communication terminal.

The first battery connection line 68 does not share a common part with the second battery connection line 69, and is independent of the second battery connection line 69. The first signal and the second signal indicate that the discharge from the battery 60 is forbidden or allowed.

The fuse 66 is on a positive electrode line. The positive electrode line connects the positive electrode of the battery 60 to the first positive terminal 61. The fuse 66 is configured to be fusion-cut in response to a command from the first control circuit 65. The fusion-cut of the fuse 66 disconnects the positive electrode line, making the battery 60 non-reusable.

The shunt resistor 67 is on a negative electrode line. The negative electrode line connects the negative electrode of the battery 60 to the first negative terminal 62. The first control circuit 65 detects a discharge current value through the shunt resistor 67. The discharge current value corresponds to a magnitude of the current flowing from the battery 60.

The battery pack 20 includes a temperature detection circuit 70. The temperature detection circuit 70 detects a battery temperature and outputs a detection signal indicating the battery temperature to the first control circuit 65. The battery temperature corresponds to a temperature of at least one cell included in the battery 60. The first control circuit 65 also includes a voltage detection circuit 71 and detects a battery voltage value. The battery voltage value corresponds to a magnitude of an output voltage of the battery 60.

The electric work machine 1 includes a controller 30. The controller 30 includes a second interface 140. The second interface 140 is connected to the first interface 160 of the battery pack 20. The second interface 140 includes a second positive terminal 41. The second positive terminal 41 is connected to the first positive terminal 61. The second interface 140 includes a second negative terminal 42. The second negative terminal 42 is connected to the first negative terminal 62.

The second interface 140 includes a second DS terminal 43. The second DS terminal 43 is connected to the first DS terminal 63. The second DS terminal 43 is a dedicated terminal to receive the first signal transmitted from the battery pack 20.

The second interface 140 includes a second TR terminal 44. The second TR terminal 44 is connected to the first TR terminal 64. The second TR terminal 44 is a terminal to receive the battery signals including the second signal transmitted from the battery pack 20. In this embodiment, the second DS terminal 43 and/or the second TR terminal 44 corresponds to one example of a second communication terminal.

The second DS terminal 43 is connected to a second control circuit 36 described below through a first work machine connection line 48. The second TR terminal 44 is connected to the second control circuit 36 through a second work machine connection line 49. The first work machine connection line 48 does not share a common part with the second work machine connection line 49 and is independent of the second work machine connection line 49.

The controller 30 includes a regulator 38. The regulator 38 receives the electric power from the battery 60 and generates a constant power supply voltage Vcc (e.g., direct current 5V) necessary to activate various circuits in the controller 30. The regulator 38 supplies the generated power supply voltage Vcc to the various circuits.

The controller 30 includes the second control circuit 36. The second control circuit 36 is embodied in the form of a microcomputer including a second CPU 36a, a second memory 36b, and an I/O. The second control circuit 36 performs a discharge control process and the like described below by the second CPU 36a executing a program stored in the second memory 36b. The second control circuit 36 corresponds to one example of a second controller of the present disclosure.

The second memory 36b stores third data and/or fourth data. The third data includes identification information to identify at least one compatible pack. The fourth data includes identification information to identify at least one incompatible pack. The compatible pack corresponds to a battery pack adapted to the electric work machine 1, and the incompatible pack corresponds to a battery pack that is not adapted to the electric work machine 1.

The electric work machine 1 has properties including a rated voltage Va and an allowable impedance Za. The allowable impedance Za is a minimum magnitude of an impedance that can be accepted by the electric work machine 1. The incompatible pack has properties including the rated voltage Va and an impedance Zb (<Za). In response to the incompatible pack being connected to the electric work machine 1, an electric current with a magnitude of greater than a second upper limit may flow through the electric work machine 1. The second upper limit corresponds to a maximum magnitude of the electric current that can be accepted by the electric work machine 1. Therefore, if the incompatible pack is connected to the electric work machine 1, the electric work machine 1 should desirably forbid the discharge from the battery pack 20

The compatible pack has properties including the rated voltage Va and an impedance Zc (≥Za). Thus, if the compatible pack is connected to the electric work machine 1, the electric current with a magnitude of the second upper limit or less flows through the electric work machine 1. Thus, the compatible pack is allowed to discharge to the electric work machine 1. On the other hand, the incompatible pack is forbidden to discharge to the electric work machine 1.

When the electric work machine 1 is designed, produced or placed on the market, it has been known which existing battery packs are compatible or incompatible with the electric work machine 1. Thus, the electric work machine 1 includes the second memory 36b storing the third data and/or the fourth data. The second memory 36b may be configured to update the third data and/or the fourth data through a service base and the Internet. In this embodiment, the second memory 36b stores the third data.

Examples of the identification information may include a pack model name, model number, product name, and generation of the battery pack. For example, the pack model name and the model number may be a string consisting of alphabets and numbers. In this embodiment, the third data includes the model names of the compatible packs as the identification information.

In response to the battery pack 20 being connected to the electric work machine 1, the second control circuit 36 transmits the work machine data through the second TR terminal 44. In this embodiment, the work machine data includes the work machine model name of the electric work machine 1. In response to the battery pack 20 being connected to the electric work machine 1, the second control circuit 36 receives the battery data through the second TR terminal 44.

Furthermore, if the third data includes the received battery data, the second control circuit 36 transmits a first request signal to the battery pack 20 through the second TR terminal 44. The first request signal requests the battery pack 20 to allow the discharge.

The controller 30 includes a battery voltage detection circuit 28. The battery voltage detection circuit 28 detects a battery voltage value and outputs a detection signal indicating the battery voltage value to the second control circuit 36. The battery voltage value corresponds to a magnitude of an output voltage of the battery 60. That is, the battery voltage value corresponds to a voltage value between the second positive terminal 41 and the second negative terminal 42.

The second control circuit 36 is connected to the second DS terminal 43, the second TR terminal 44, the trigger switch 12, the main switch 24, the indicator 25 and the battery voltage detection circuit 28. Although not shown, the second control circuit 36 is also connected to the forward/reverse changeover switch 9 and the speed change dial 23.

The controller 30 includes a drive circuit 32. The drive circuit 32 receives the electric power from the battery 60 and applies the electric current to each winding corresponding to a phase of the motor 50. The drive circuit 32 is a three-phase full-bridge circuit including high-side switching elements Q1 through Q3 and low-side switching elements Q4 through Q6. Each of the switching elements Q1 through Q6 includes, for example, MOSFET; however, it may include any devices other than MOSFET.

The controller 30 includes a gate circuit 34. In accordance with a control signal output from the second control circuit 36, the gate circuit 34 turns on or off the switching elements Q1 through Q6, and sequentially applies the electric current to each of the three-phase windings of the motor 50. As a result, the motor 50 rotates. In response to all of the switching elements Q1 through Q6 being OFF, the motor 50 is in a free-run state. The motor 50 is in a so-called short-circuit braking state when (i) the switching elements Q1 through Q3 are OFF and the switching elements Q4 through Q6 are ON or (ii) the switching elements Q1 through Q3 are ON and the switching elements Q4 through Q6 are OFF.

The controller 30 includes a first current path 551. The first current path 551 electrically connects the second positive terminal 41 to the drive circuit 32. The controller 30 includes a second current path 552. The second current path 552 electrically connects the second negative terminal 42 to the drive circuit 32. The controller 30 includes a switching element 55 on the first current path 551. In response to the switching element 55 being ON, the first current path 551 is established. In response to the switching element 55 being OFF, the first current path 551 is interrupted (disconnected). The switching element 55 may be placed on the second current path 552. The switching element 55 is one example of a switching element of the present disclosure.

The controller 30 includes a current detection circuit 54 on the second current path 552. The current detection circuit 54 detects a motor current value and outputs a detection signal indicating the motor current value to the second control circuit 36. The motor current value corresponds to the magnitude of the current flowing through the motor 50.

The controller 30 includes a temperature detection circuit 56. The temperature detection circuit 56 is arranged near the switching elements Q1 through Q6. The temperature detection circuit 56 detects the temperature of the switching elements Q1 through Q6 and outputs a detection signal indicating the temperature to the second control circuit 36.

The controller 30 includes a latch circuit 35. The latch circuit 35 includes a first input terminal, a second input terminal, and an output terminal. The first input terminal is connected to the first work machine connection line 48. The second input terminal is connected to a connection line between the trigger switch 12 and the second control circuit 36. The output terminal is connected to a stop circuit 39 described below.

The controller 30 includes the stop circuit 39. The stop circuit 39 is provided to include six output paths. The six output paths connect the second control circuit 36 to the gate circuit 34. The control signal of the three-phase motor reaches from the second control circuit 36 to the gate circuit 34 through the six output paths. The stop circuit 39 includes a switch element on each of the six output paths.

The controller 30 includes a buffer 37 on the first work machine connection line 48. Specifically, the buffer 37 is between a first connection point and the second control circuit 36. The first connection point corresponds to an intersection of the first input terminal of the latch circuit 35 and the first work machine connection line 48.

The latch circuit 35 outputs a first circuit signal when (i) the discharge permission signal is input from the first input terminal and (ii) an ON signal of the trigger switch 12 is input from the second input terminal. The first circuit signal turns on each of the six switch elements of the stop circuit 39. In the case where the discharge prohibition signal is input from the first input terminal while outputting the first signal, the latch circuit 35 outputs a second circuit signal until an OFF signal of the trigger switch 12 is input from the second input terminal. The second circuit signal latches each of the switch elements of the stop circuit 39 in the OFF state. That is, the latch circuit 35 maintains a discharge prohibition state in response to the discharge prohibition signal being input into the latch circuit 35 until the trigger switch 12 is turned off. This inhibits a sudden activation of the motor 50 even if the discharge prohibition signal to be input from the second DS terminal 43 is lost due to the failure or the like in the first control circuit 65.

The buffer 37 transmits signals in one direction. The one direction is a direction from the second DS terminal 43 to the second control circuit 36. If the buffer 37 is not arranged on the first work machine connection line 48, the second control circuit 36 may lose control and output the discharge permission signal from the second control circuit 36 to the first input terminal of the latch circuit 35. Consequently, the second control circuit 36 may erroneously turn on the six switch elements of the stop circuit 39. Since the buffer 37 is arranged between the first connection point and the second control circuit 36, even if the second control circuit 36 erroneously outputs the discharge permission signal, the discharge permission signal is not input into the first input terminal of the latch circuit 35. As a result, it is possible to avoid erroneously turning on the six switch elements of the stop circuit 39.

<1-2. Process>
<1-2-1. Discharge Control Process>

Next, a discharge control process to be executed by the first control circuit 65 is described with reference to the flow chart of FIG. 3. The first control circuit 65 starts this process upon detection of the connection of the electric work machine 1 to the battery pack 20.

In S10, the first control circuit 65 determines whether the electric work machine 1 is the compatible work machine. Specifically, the first control circuit 65 obtains the work machine data received through the first TR terminal 64. Then, the first control circuit 65 determines whether the work machine model name included in the work machine data is matched with any of the model names of the compatible work machines included in the first data. Upon determination that the work machine model name is matched with any of the model names of the compatible work machines (S10: YES), the first control circuit 65 proceeds to a process of S18. Upon determination that work machine model name is different from any of the model names of the compatible work machines (S10: NO), the first control circuit 65 proceeds to a process of S20.

In S20, the first control circuit 65 determines whether the first control circuit 65 has received the first request signal from the electric work machine 1 through the first TR terminal 64. Upon determination that the first control circuit 65 has received the first request signal (S20: YES), the first control circuit 65 proceeds to a process of S30. Upon determination that the first control circuit 65 has not received the first request signal (S20: NO), the first control circuit 65 proceeds to a process of S100.

In S18, the first control circuit 65 transmits the second request signal to the second control circuit 36 through the first TR terminal 64. When the battery pack 20 is a new battery pack, the third data does not include the pack model name of the battery pack 20 even if it is the compatible pack. Here, the new battery pack means a battery pack that appears after the electric work machine 1. On the other hand, since the battery pack 20 appears after the electric work machine 1, the first data includes the work machine model name of the electric work machine 1 when the electric work machine 1 is the compatible work machine. Thus, when the first data includes the work machine model name of the electric work machine 1, the first control circuit 65 transmits the second request signal to the second control circuit 36. As described in detail below, upon receipt of the second request signal, the second control circuit 36 executes the same process as in the case where the battery pack 2 is determined as the compatible pack.

In S30, the first control circuit 65 determines whether the battery 60 is in an over-discharge state based on the battery voltage value. Upon determination that the battery 60 it not in the over-discharge state (S30: NO), the first control circuit 65 proceeds to a process of S40. Upon determination that the battery 60 is in the over-discharge state (S30: YES), the first control circuit 65 proceeds to a process of S60.

In S40, the first control circuit 65 determines whether the battery 60 is in an over-heated state based on the battery temperature. Upon determination that the battery 60 it not in the over-heated state (S40: NO), the first control circuit 65 proceeds to a process of S50. Upon determination that the battery 60 is in the over-heated state (S40: YES), the first control circuit 65 proceeds to a process of S60.

In S50, the first control circuit 65 transmits the discharge permission signal (specifically, Lo signal) to the electric work machine 1 through the first DS terminal 63. In this way, the discharge permission signal is transmitted to the electric work machine 1 when (i) the electric work machine 1 is the compatible work machine and (ii) the battery 60 is in a dischargeable state.

Even if the work machine model name is different from any of the model names of the compatible work machines in the first data, the discharge permission signal is transmitted to the electric work machine 1 when (i) the first control circuit 65 has received the first request signal and (ii) the battery 60 is in the dischargeable state. The first request signal is described in detail below. After executing the process of S50, the first control circuit 65 proceeds to a process of S130.

In S60, the first control circuit 65 transmits the discharge prohibition signal following the communication protocol to the electric work machine 1 by a serial communication through the first TR terminal 64 and requests the electric work machine 1 to stop the discharge. The discharge prohibition signal following the communication protocol is a multi-bit signal, and each of the multiple bits is represented in a Hi signal or a Lo signal in accordance with the communication protocol. The Hi signal is a signal with a high-level voltage, and the Lo signal is a signal with a low-level voltage.

In S70, the first control circuit 65 then determines whether the over-discharge state continues for a time TA1. That is, the first control circuit 65 determines whether the over-discharge state continues even though the request for the stop of the discharge was transmitted in S60. For example, TA1 is 0.5 seconds. Upon determination that the over-discharge state does not continue for the time TA1 (S70: NO), the first control circuit 65 proceeds to the process of S50. Upon determination that the over-discharge state continues for the time TA1 (S70: YES), the first control circuit 65 proceeds to a process of S80.

In S80, the first control circuit 65 transmits the discharge prohibition signal not following the communication protocol to the electric work machine 1 through the first TR terminal 64. Examples of the discharge prohibition signal not following the communication protocol may include a signal with a fixed voltage level, a signal with a higher frequency than a normal clock signal, and a random signal.

In this embodiment, the discharge prohibition signal not following the communication protocol is the signal with a fixed voltage level. Specifically, the first TR terminal 64 outputs the Hi signal or the Lo signal. The first TR terminal 64 outputs the Lo signal during standby in the serial communication. That is, during standby in the serial communication, the voltage level of the first TR terminal 64 is fixed to a low level. In contrast, during the output of the signal not following the communication protocol, the voltage level of the first TR terminal 64 is fixed to a high level. The discharge prohibition signal not following the communication protocol is a signal composed of continuous Hi signals.

If the battery 60 is overloaded, a noise is easily superposed on a serial signal. Since the discharge prohibition signal is the signal with a constant fixed voltage level, the noise resistance of the discharge prohibition signal can improve, and the discharge prohibition signal can be transmitted with high certainty to the controller 30. Alternatively, the voltage level of the first TR terminal 64 may be fixed to the high level during standby in the serial communication, and the voltage level of the first TR terminal 64 may be fixed to the low-level during the output of the discharge prohibition signal not following the communication protocol. That is, the discharge prohibition signal not following the communication protocol may be a signal composed of continuous Lo signals.

Subsequently in S90, the first control circuit 65 determines whether the discharge current continuously flows for a time TB1 or longer after the transmission of the discharge prohibition signal (specifically, Hi signal) not following the communication protocol through the first TR terminal 64 in S80. For example, TB1 is 0.5 seconds. Upon determination that the discharge current does not continuously flow for the time TB1 or longer (S90: NO), the first control circuit 65 proceeds to the process of S50. Upon determination that the discharge current continuously flows for the time TB1 or longer (S90: YES), the first control circuit 65 proceeds to a process of S100.

In S100, the first control circuit 65 transmits the discharge prohibition signal to the electric work machine 1 through the first DS terminal 63. Specifically, the first control circuit 65 sets the first DS terminal 63 in a high impedance state.

Subsequently in S110, the first control circuit 65 determines whether the discharge current continuously flows for a time TC1 or longer after the transmission of the discharge prohibition signal through the first DS terminal 63 in S100. For example, TC1 is 0.75 seconds. Upon determination that the discharge current does not continuously flow for the time TC1 or longer (S110: NO), the first control circuit 65 proceeds to a process of S130. Upon determination that the discharge current continuously flows for the time TC1 or longer (S110: YES), the first control circuit 65 proceeds to a process of S120.

In S120, the first control circuit 65 outputs a blow command to blow the fuse 66. This stops the discharge from the battery 60.

Subsequently in S130, the first control circuit 65 determines whether the electric work machine 1 is connected to the battery pack 20. Upon determination that the electric work machine 1 is connected to the battery pack 20 (S130: YES), the first control circuit 65 returns to the process of S10. Upon determination that the electric work machine 1 is not connected to the battery pack 20 (S130: NO), the first control circuit 65 ends this process.

<1-2-2. Main Process>

Figure 4:
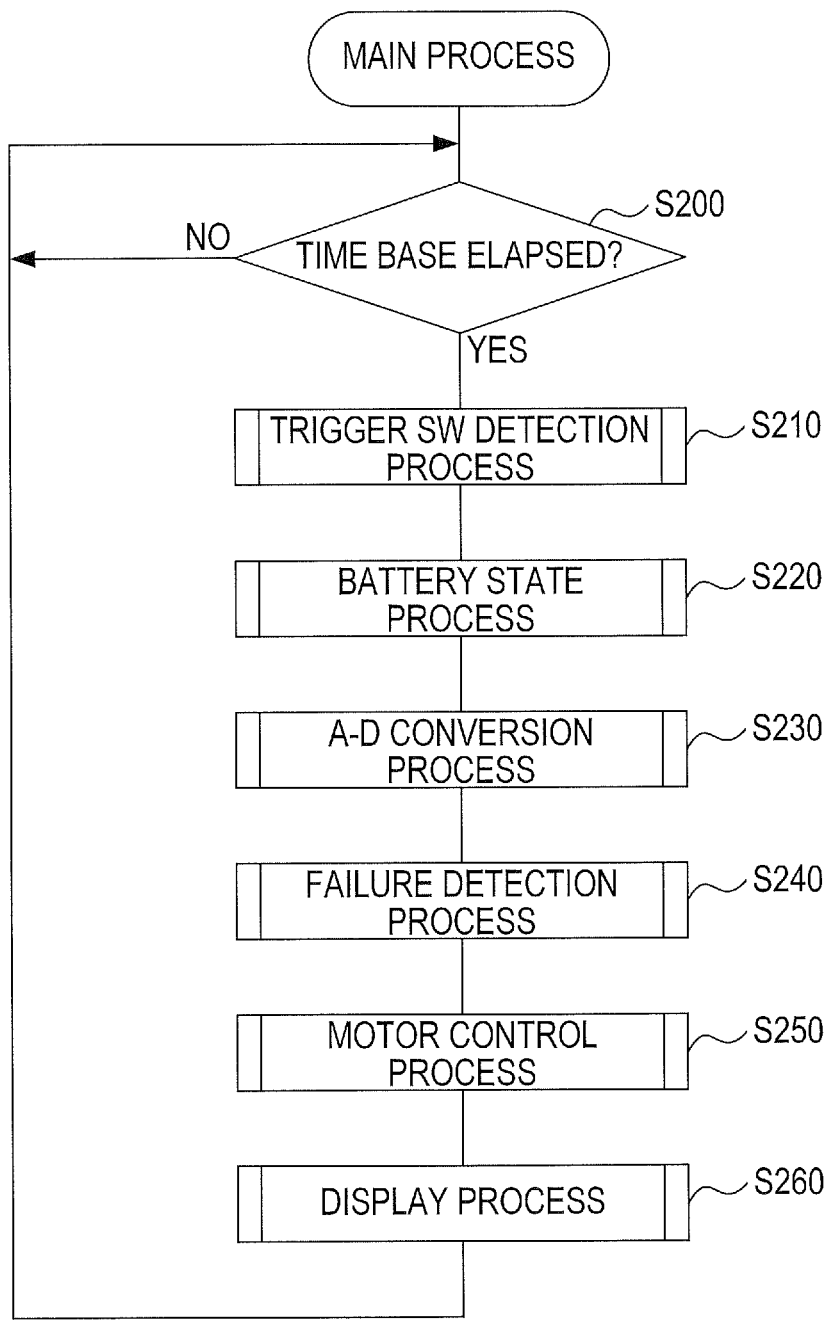
FIG. 4 is a flow chart showing a main process to be executed by a second control circuit according to the first embodiment.

Then, with reference to the flow chart of FIG. 4, a main process to be executed by the second control circuit 36 is described.

First, in S200, the second control circuit 36 determines whether a time base has elapsed. Upon determination that the time base has not elapsed (S200: NO), the second control circuit 36 waits for the lapse. Upon determination that the time base has elapsed (S200: YES), the second control circuit 36 proceeds to a process of S210. The time base corresponds to a control cycle of the second control circuit 36.

In S210, the second control circuit 36 executes a detection process of the trigger switch 12. Specifically, the second control circuit 36 detects whether the trigger switch 12 is ON or OFF based on a signal from the trigger switch 12.

Subsequently in S220, the second control circuit 36 executes a battery state process based on the battery information obtained from the battery pack 20. The battery state process is described in detail below.

Subsequently in S230, the second control circuit 36 executes an A-D conversion process. Specifically, the second control circuit 36 carries out A-D conversion of the detection signals input from the battery voltage detection circuit 28, the current detection circuit 54, and the temperature detection circuit 56. The second control circuit 36 thereby obtains a motor current value, a battery voltage value, and a temperature of the switching element.

Subsequently in S240, the second control circuit 36 executes a failure detection process. Specifically, the second control circuit 36 compares the motor current value, battery voltage value, and temperature obtained in S230 with their respective thresholds to detect a faulty state such as an overcurrent, a low battery voltage, and a high-temperature state of the switching element. Upon detection of at least one faulty state, the second control circuit 36 sets a motor faulty flag.

Subsequently in S250, the second control circuit 36 executes a motor control based on the ON/OFF state of the trigger switch 12, the battery state, and the detection result of the faulty state. The motor control process is described in detail below.

Subsequently in S260, the second control circuit 36 executes a display process. Specifically, the second control circuit 36 causes the indicator 25 to display the operation state of the motor 50, the remaining energy of the battery 60, and the detected faulty state to inform the user thereof. Thereafter, this process ends.

<1-2-3. Battery State Recognition Process>

Figure 5:
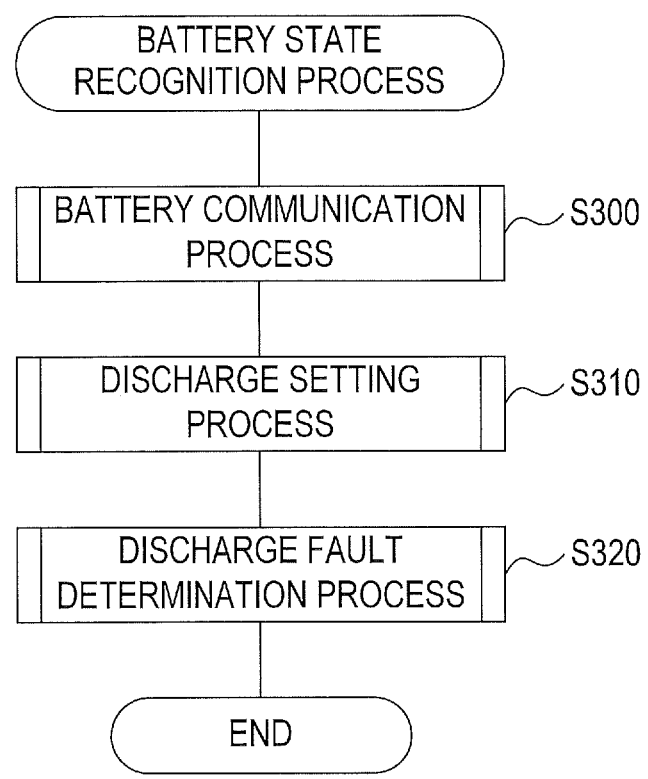
FIG. 5 is a flow chart showing a battery state recognition process to be executed by the second control circuit according to the first embodiment.

Next, the battery state recognition process to be executed by the second control circuit 36 in S220 is described in detail with reference to the flow chart of FIG. 5.

First, in S300, the second control circuit 36 executes a battery communication process. Specifically, in response to the second control circuit 36 detecting that the battery pack 20 is connected to the electric work machine 1, an initial communication is executed. In the initial communication, the second control circuit 36 transmits the work machine data to the battery pack 20 through the second TR terminal 44. The work machine data includes the work machine model name of the electric work machine 1. The second control circuit 36 receives the battery data from the battery pack 20 through the second TR terminal 44. The battery data includes the pack model name of the battery pack 20.

Furthermore, the second control circuit 36 transmits an information request signal to the first control circuit 65 through the second TR terminal 44 in a specified cycle and receives a battery signal as a response to the information request signal from the first control circuit 65. If a discharge current does not flow from the battery pack 20 to the electric work machine 1, the second control circuit 36 sets a transmission cycle of the information request signal to T1. If the discharge current flows from the battery pack 20 to the electric work machine 1, the second control circuit 36 sets the transmission cycle of the information request signal to T2 (<T1).

Subsequently, in S310, the second control circuit 36 executes the discharge setting process, and sets a discharging state of the battery 60 based on the first signal and the second signal output from the battery pack 20. The discharge setting process is described in detail below.

Subsequently in S320, the second control circuit 36 executes the discharge fault determination process based on the result of the discharge setting process in S310. The discharge fault determination process is described in detail below. Thereafter, this process ends.

<1-2-4. Discharge Setting Process>

Figure 6:
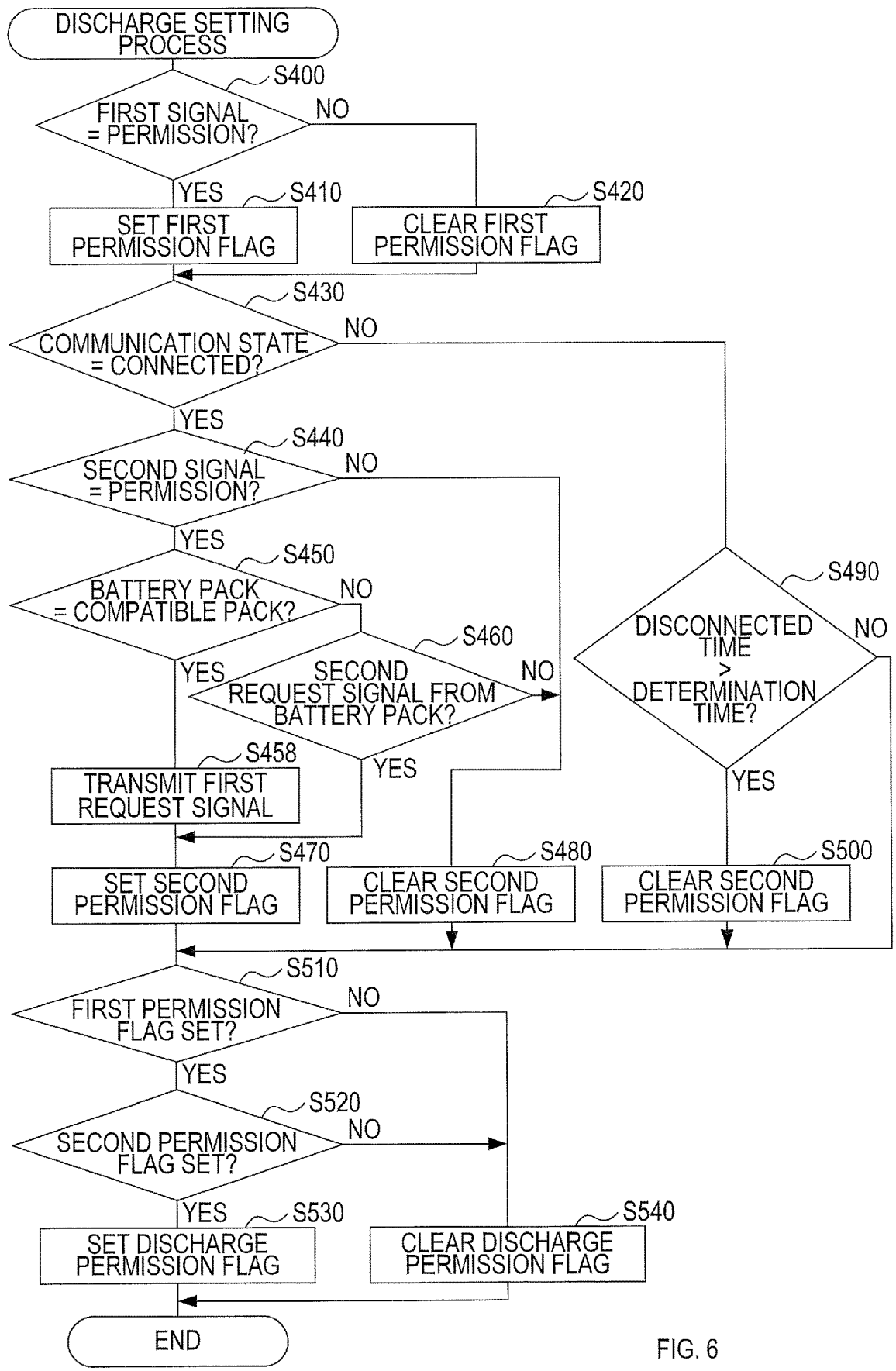
FIG. 6 is a flow chart showing a discharge setting process to be executed by the second control circuit according to the first embodiment.

Next, with reference to the flow chart of FIG. 6, the discharge setting process to be executed by the second control circuit 36 in S310 is described.

First, in S400, the second control circuit 36 determines whether the first signal received through the second DS terminal 43 is the discharge permission signal. The second control circuit 36 receives the discharge prohibition signal even if the battery pack 20 is not connected to the electric work machine 1. More specifically, the second control circuit 36 receives the discharge prohibition signal even if the first DS terminal 63 is not connected to the second DS terminal 43. That is, an electric potential of the first work machine connection line 48 when the first DS terminal 63 is not connected to the second DS terminal 43 is the same as an electric potential of the first work machine connection line 48 when the discharge prohibition signal was output through the first DS terminal 63. Upon determination that the first signal is the discharge permission signal (S400: YES), the second control circuit 36 proceeds to a process of S410. Upon determination that the first signal is the discharge prohibition signal (S400: NO), the second control circuit 36 proceeds to a process of S420.

In S410, the second control circuit 36 sets a first permission flag and proceeds to a process of S430.

In S420, the second control circuit 36 clears the first permission flag and proceeds to a process of S430.

In S430, the second control circuit 36 determines whether a communication state with the first control circuit 65 is in a connected state. That is, the second control circuit 36 determines whether a serial communication is established between the second control circuit 36 and the first control circuit 65. Specifically, the second control circuit 36 determines that the communication state is in the connected state if there is a response to the information request signal transmitted to the first control circuit 65. The second control circuit 36 determines that the communication state is in a disconnected state if there is no response to the information request signal. Upon determination that the communication state is in the connected state (S430: YES), the second control circuit 36 proceeds to a process of S440. Upon determination that the communication state is in the disconnected state (S430: NO), the second control circuit 36 proceeds to a process of S490.

In S440, the second control circuit 36 determines whether the second signal received through the second TR terminal 44 is the discharge permission signal. Upon determination that the second signal is the discharge permission signal (S440: YES), the second control circuit 36 proceeds to a process of S450. Upon determination that the second signal is the discharge prohibition signal (S440: NO), the second control circuit 36 proceeds to a process of S480.

In S450, the second control circuit 36 determines whether the battery pack 20 is the compatible pack. Specifically, the second control circuit 36 obtains the battery data received through the second TR terminal 44. Then, the second control circuit 36 determines whether the pack model name included in the battery data is matched with any of the model names of the compatible packs in the third data. Upon determination that the pack model name is matched with any of the model names of the compatible packs (S450: YES), the second control circuit 36 proceeds to a process of S458. Upon determination that the pack model name is different from any of the model names of the compatible packs (S450: NO), the second control circuit 36 proceeds to a process of S460.

In S458, the second control circuit 36 transmits the first request signal to the first control circuit 65 through the second TR terminal 44. When the electric work machine 1 is a new electric work machine, the first data does not include the work machine model name of the electric work machine 1 even if the work machine 1 is the compatible work machine. The new electric work machine here is the electric work machine that appears after the battery pack 20. On the other hand, since the electric work machine 1 appears after the battery pack 20, the third data includes the pack model name of the battery pack 20 when the battery pack 20 is the compatible pack. Thus, the second control circuit 36 transmits the first request signal to the first control circuit 65 when the third data includes the pack model name of the battery pack 20. Upon receipt of the first request signal, the first control circuit 65 executes the same process as in the case where the first control circuit 65 determines that the electric work machine 1 is the compatible work machine.

In S460, the second control circuit 36 determines whether the second control circuit 36 has received the second request signal from the battery pack 20 through the second TR terminal 44. Upon determination that the second control circuit 36 has received the second request signal (S460: YES), the second control circuit 36 proceeds to a process of S470. Upon determination that the second control circuit 36 has not received the second request signal (S460: NO), the second control circuit 36 proceeds to a process of S480.

In S470, the second control circuit 36 sets a second permission flag and proceeds to a process of S510.

In S480, the second control circuit 36 clears the second permission flag and proceeds to a process of S510.

In S490, the second control circuit 36 determines whether a disconnected time is longer than a determination time. The disconnected time is the time during which the second control circuit 36 is not connected to the first control circuit 65. Specifically, the second control circuit 36 determines whether the second control circuit 36 has received a response from the first control circuit 65 during the period between the transmission of the information request signal to the first control circuit 65 and the elapse of the determination time. The determination time is a preset time. Upon determination that the disconnected time is longer than the determination time (S490: YES), the second control circuit 36 proceeds to S500. Upon determination that the disconnected time is shorter than or equal to the determination time (S490: NO), the second control circuit 36 proceeds to a process of S510.

In S500, the second control circuit 36 clears the second permission flag and proceeds to a process of S510. Thus, if the serial communication is not established between the second control circuit 36 and the first control circuit 65, the second control circuit 36 executes the same process as in the case where the second control circuit 36 receives the discharge prohibition signal through the second TR terminal 44.

In S510, the second control circuit 36 determines whether the first permission flag is set. Upon determination that the first permission flag is set (S510: YES), the second control circuit 36 proceeds to a process of S520. Upon determination that the first permission flag is not set (S510: NO), the second control circuit 36 proceeds to a process of S540.

In S520, the second control circuit 36 determines whether the second permission flag is set. Upon determination that the second permission flag is set (S520: YES), the second control circuit 36 proceeds to a process of S530. Upon determination that the second permission flag is not set (S520: NO), the second control circuit 36 proceeds to the process of S540.

In S530, the second control circuit 36 sets a discharge permission flag. That is, the second control circuit 36 sets the discharge permission flag only when both of the first permission flag and the second permission flag are set.

In S540, the second control circuit 36 clears the discharge permission flag. That is, the second control circuit 36 clears the discharge permission flag when at least one of the first permission flag and the second permission flag is not set.

<1-2-5. Discharge Fault Determination Process>

Figure 7:
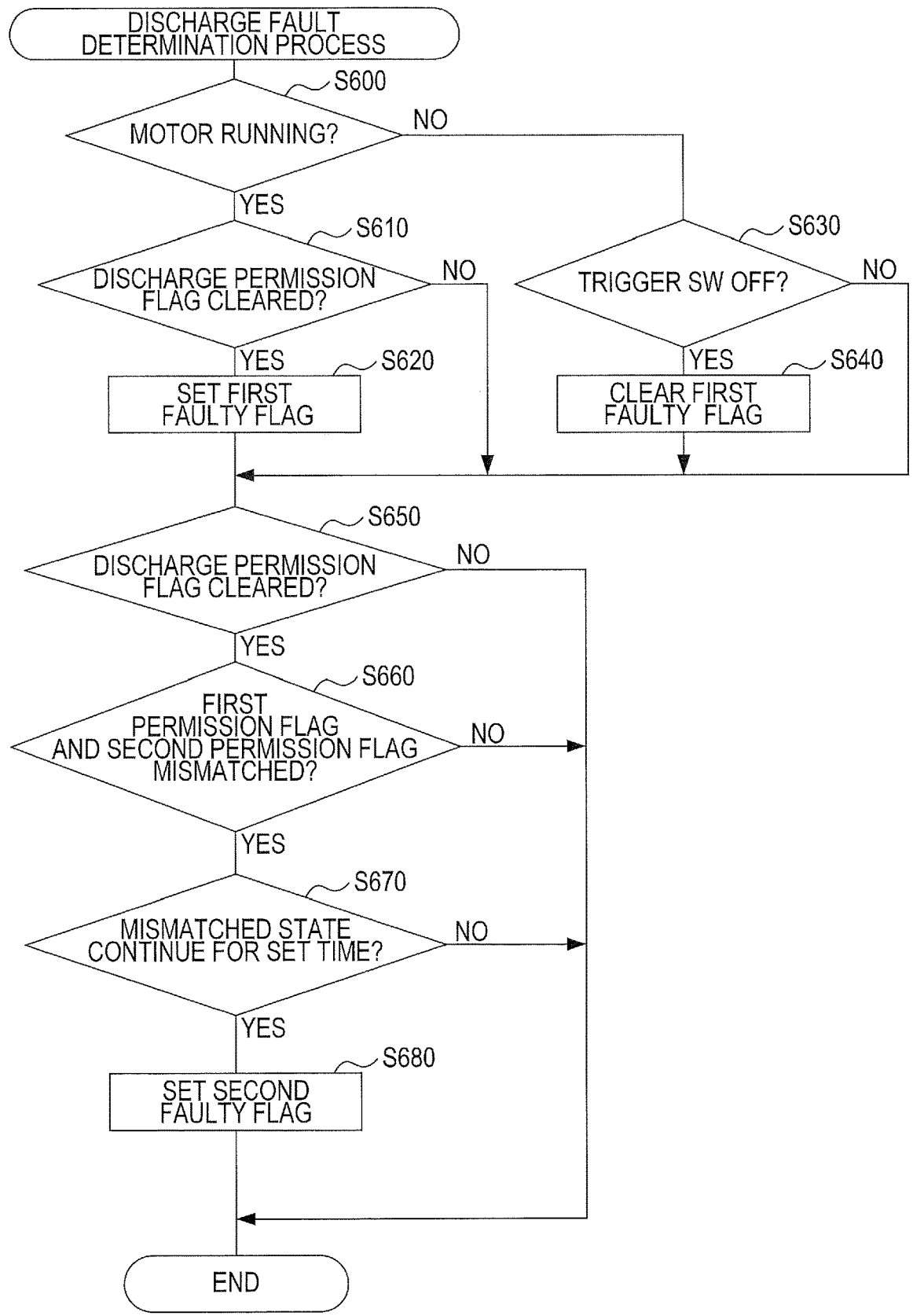
FIG. 7 is a flow chart showing a discharge fault determination process to be executed by the second control circuit according to the first embodiment.

Next, the discharge fault determination process to be executed by the second control circuit 36 in S320 is described with reference to FIG. 7.

First, in S600, the second control circuit 36 determines whether the motor 50 is running. Upon determination that the motor 50 is running (S600: YES), the second control circuit 36 proceeds to a process of S610. Upon determination that the motor 50 is stopped (S600: NO), the second control circuit 36 proceeds to a process of S630.

In S610, the second control circuit 36 determines whether the discharge permission flag is cleared. Upon determination that the discharge permission flag is cleared (S610: YES), the second control circuit 36 proceeds to a process of S620. Upon determination that the discharge permission flag is set (S610: NO), the second control circuit 36 proceeds to a process of S650.

In S620, the second control circuit 36 sets a flag and proceeds to a process of S650.

In S630, the second control circuit 36 determines whether the trigger switch 12 is OFF. Upon determination that the trigger switch 12 is OFF (S630: YES), the second control circuit 36 proceeds to a process of S640. Upon determination that the trigger switch 12 is ON (S630: NO), the second control circuit 36 proceeds to a process of S650.

In S640, the second control circuit 36 clears the first faulty flag and proceeds to the process of S650.

In S650, the second control circuit 36 determines whether the discharge permission flag is cleared. Upon determination that the discharge permission flag is cleared (S650: YES), the second control circuit 36 proceeds to a process of S660.

Upon determination that the discharge permission flag is set (S650: NO), the second control circuit 36 ends this process.

In S660, the second control circuit 36 determines whether the first permission flag and the second permission flag are mismatched. That is, the second control circuit 36 determines whether both of the first and second permission flags are cleared. Upon determination that the first permission flag and the second permission flag are mismatched (S660: YES), the second control circuit 36 proceeds to a process of S670. Upon determination that the first permission flag and the second permission flag are matched (S660: NO), the second control circuit 36 ends this process.

In S670, the second control circuit 36 determines whether a mismatched state of the first permission flag and the second permission flag continues for a set time or longer. The set time is set to a cycle to output the information request signal. Alternatively, the set time is set to a period of time longer than the cycle to output the information request signal.

Upon determination that the mismatched state of the first permission flag and the second permission flag continues for the set time or longer (S670: YES), the second control circuit 36 proceeds to a process of S680. Upon determination that the mismatched state continues for less than the set time (S670: NO), the second control circuit 36 ends this process.

In S680, the second control circuit 36 sets a second faulty flag and ends this process.

<1-2-6. Motor Control Process>

Figure 8:
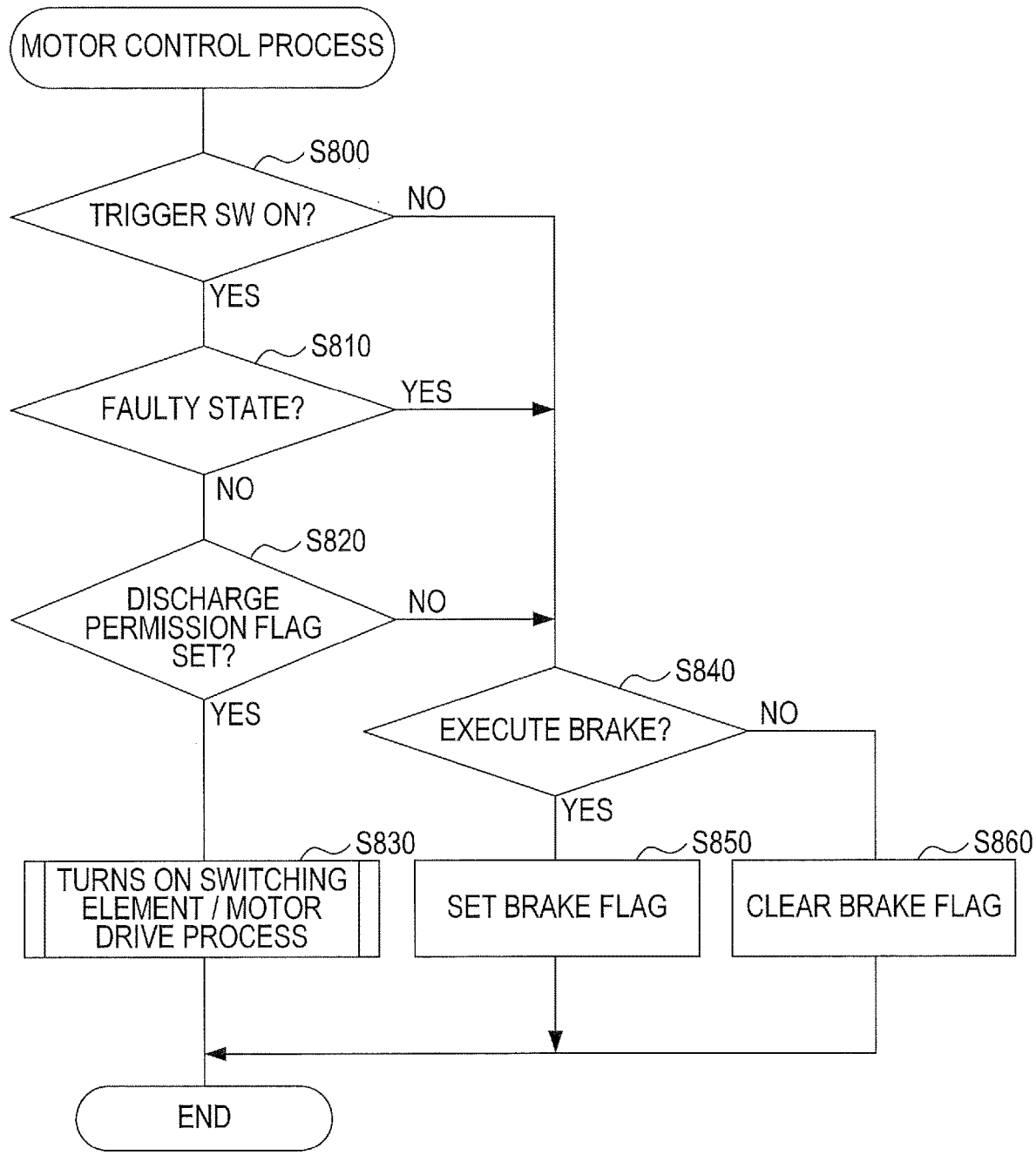
FIG. 8 is a flow chart showing a motor control process to be executed by the second control circuit according to the first embodiment.

Next, the motor control process to be executed by the second control circuit 36 in S250 is described with reference to the flow chart of FIG. 8.

First, in S800, the second control circuit 36 determines whether the trigger switch 12 is ON. Upon determination that the trigger switch 12 is ON (S800: YES), the second control circuit 36 proceeds to a process of S810. Upon determination that the trigger switch 12 is OFF (S800: NO), the second control circuit 36 proceeds to a process of S840.

In S810, the second control circuit 36 determines whether any of the motor 50, the controller 30 and the battery pack 20 is in a faulty state (e.g., defective state, improper state, or malfunction state). Specifically, the second control circuit 36 determines whether any of the motor faulty flag, the first faulty flag and the second faulty flag is set. Upon determination that none of the faulty flags is set (S810: NO), the second control circuit 36 proceeds to a process of S820. Upon determination that any one of the faulty flags is set (S810: YES), the second control circuit 36 proceeds to a process of S840.

In S820, the second control circuit 36 determines whether the discharge permission flag is set. Upon determination that the discharge permission flag is set (S820: YES), the second control circuit 36 proceeds to a process of S830. Upon determination that the discharge permission flag is cleared (S820: NO), the second control circuit 36 proceeds to the process of S840.

In S830, the second control circuit 36 turns on the switching element 55 to transfer the electric power from the battery 60 to the motor 50. Then, the second control circuit 36 executes a motor drive process. Specifically, the second control circuit 36 calculates an actual rotational speed of the motor 50 based on the rotation detection signal from the rotation detection sensor 52. The second control circuit 36 also sets a desired rotational speed of the motor 50 based on the setting of the speed change dial 23. The second control circuit 36 also sets the rotation direction of the motor 50 based on the setting of the forward/reverse changeover switch 9. Then, the second control circuit 36 calculates a duty ratio of the Pulse Width Modulation (PWM) signal so that the actual rotational speed becomes consistent with the desired rotational speed in the set rotation direction. The PWM signal is applied to each of the switching elements of the drive circuit 32. Furthermore, the second control circuit 36 outputs a control signal in accordance with the calculated PWM duty ratio to the gate circuit 34 and ends this process.

In S840, the second control circuit 36 determines whether to execute a brake control. Specifically, the second control circuit 36 determines to execute the brake control when the motor 50 is rotating and there is no influence on the controller 30 even if a braking force is applied to the motor 50. Upon determination to execute the brake control (S840: YES), the second control circuit 36 proceeds to a process of S850. Upon determination to not execute the brake control (S840: NO), the second control circuit 36 proceeds to a process of S860.

In S850, the second control circuit 36 turns off the switching element 55, sets the brake flag, and ends this process. The power supply from the battery 60 to the motor 50 is thereby stopped and a short-circuit braking is performed.

In S860, the second control circuit 36 turns off the switching element 55, clears the brake flag, and ends this process. The power supply from the battery 60 to the motor 50 is thereby stopped. If the motor 50 is rotating, a free-run or the like is performed.

<1-3. Effects>

In the first embodiment detailed above, the following effects can be obtained.

(1) The battery pack 20 can recognize whether the electric work machine 1 is compatible with the battery pack 20 by checking the received work machine data against the first data. If the electric work machine 1 is incompatible with the battery pack 20, the battery pack 20 outputs the discharge prohibition signal through the first TR terminal 64 to forbid the discharge. The electric work machine 1 can recognize whether the battery pack 20 is compatible with the electric work machine 1 by checking the received battery data against the third data. If the battery pack 20 is incompatible with the electric work machine 1, the electric work machine 1 turns off the switching element 55 to forbid the discharge. Therefore, it is possible to inhibit the existing specific electric work machine from using the new incompatible battery pack. It is also possible to inhibit the existing battery pack from being used by the new incompatible electric work machine.

(2) If the electric work machine 1 connected to the battery pack 20 is the new electric work machine, the battery pack 20 cannot determine whether the electric work machine 1 is compatible therewith. In contrast, the electric work machine 1 can determine whether the battery pack 20 is compatible therewith on the basis that the third data includes the battery data. Thus, the battery pack 20 transmits the discharge permission signal at least on the basis that the battery pack 20 has received the first request signal from the electric work machine 1. This makes it possible for the new electric work machine 1 to use the existing compatible pack connected thereto.

(3) If the battery pack 20 connected to the electric work machine 1 is a new battery pack, the electric work machine 1 cannot determine whether the battery pack 20 is compatible therewith. In contrast, the battery pack 20 can determine whether the electric work machine 1 is compatible therewith on the basis that the first data includes the work machine data. Thus, if the third data does not include the battery data, the electric work machine 1 determines to allow the discharge based on the receipt of the second request signal from the battery pack 20. This makes it possible for the existing compatible work machine connected to the new battery pack 20 to use the new battery pack 20.

Second Embodiment

<2-1. Differences from First Embodiment>

The basic configuration of a second embodiment is similar to that of the first embodiment, and thus, only some differences are described hereinafter. The reference numerals same as those in the first embodiment indicate the same configurations and the preceding description is equally applied thereto.

In the above-described first embodiment, the first memory 65b stores the first data, and the second memory 36b stores the third data. On the other hand, the second embodiment is different from the first embodiment in that the first memory 65b stores the second data and the second memory 36b stores the fourth data. That is, in the second embodiment, the first memory 65b stores the identification information of the incompatible work machine, and the second memory 36b stores the identification information of the incompatible battery pack. Thus, in the second embodiment, the first control circuit 65 executes a discharge control process different from that in the first embodiment. In addition, the second control circuit 36 executes a discharge setting process different from that in the first embodiment. The second control circuit 36 executes processes same as those in the first embodiment except for the discharge setting process.

<2-2. Processes>

<2-2-1. Discharge Control Process>

Figure 3:
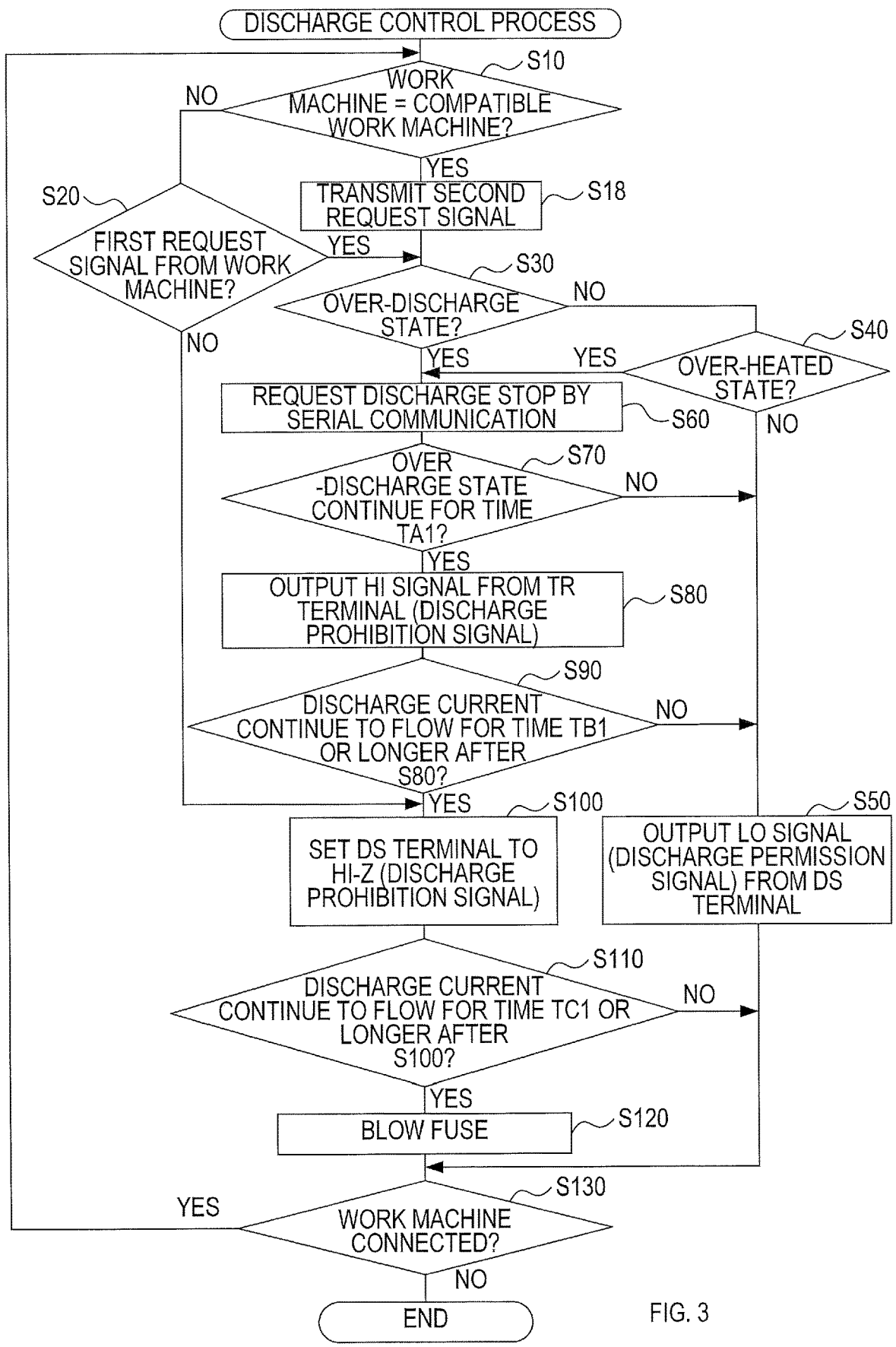
FIG. 3 is a flow chart showing a discharging control process to be executed by a first control circuit according to the first embodiment.
Figure 9:
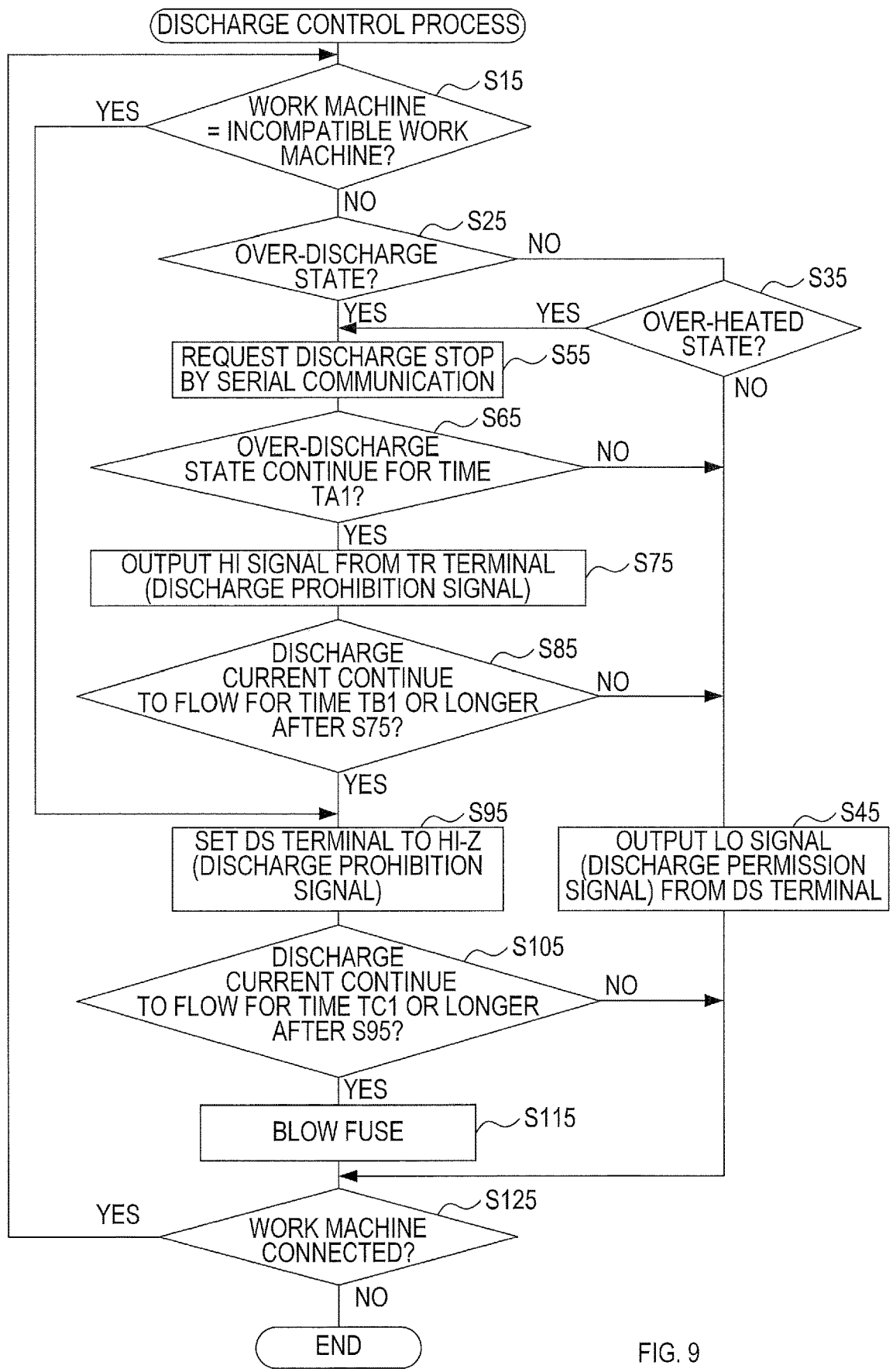
FIG. 9 is a flow chart showing a discharging control process to be executed by the first control circuit according to a second embodiment.

Next, a discharge control process to be executed by the first control circuit 65 in place of the flow chart of FIG. 3 is described with reference to the flow chart of FIG. 9.

In S15, the first control circuit 65 determines whether the electric work machine 1 is an incompatible work machine. Specifically, the first control circuit 65 obtains the work machine data received through the first TR terminal 64. Then, the first control circuit 65 determines whether the work machine model name included in the work machine data is matched with any of the model names of the incompatible work machines included in the second data. Upon determination that work machine model name is matched with any of the model names of the incompatible work machines (S15: YES), the first control circuit 65 proceeds to a process of S95. Upon determination that work machine model name is different from any of the model names of the incompatible work machines (S15: NO), the first control circuit 65 proceeds to a process of S25.

In S25 through S125, the first control circuit 65 executes the processes same as those of S30 through S130.

When the electric work machine 1 is a new electric work machine, the second data does not include the work machine model name of the electric work machine 1 regardless of whether the work machine 1 is the compatible work machine or the incompatible work machine. Therefore, the battery pack 20 transmits the discharge permission signal to the electric work machine 1 when (i) the electric work machine 1 is the new electric work machine and (ii) the battery 60 is in the dischargeable state.

On the other hand, when the electric work machine 1 is the new electric work machine, the electric work machine 1 appears after the battery pack 20. Thus, the fourth data includes the pack model name of the battery pack 20 if the battery pack 20 is the incompatible pack. When the battery pack 20 is the incompatible pack, the electric work machine 1 forbids the discharge from the battery 60 even if the electric work machine 1 received the discharge permission signal from the battery pack 20.

<2-2-2. Discharge Setting Process>

Figure 10:
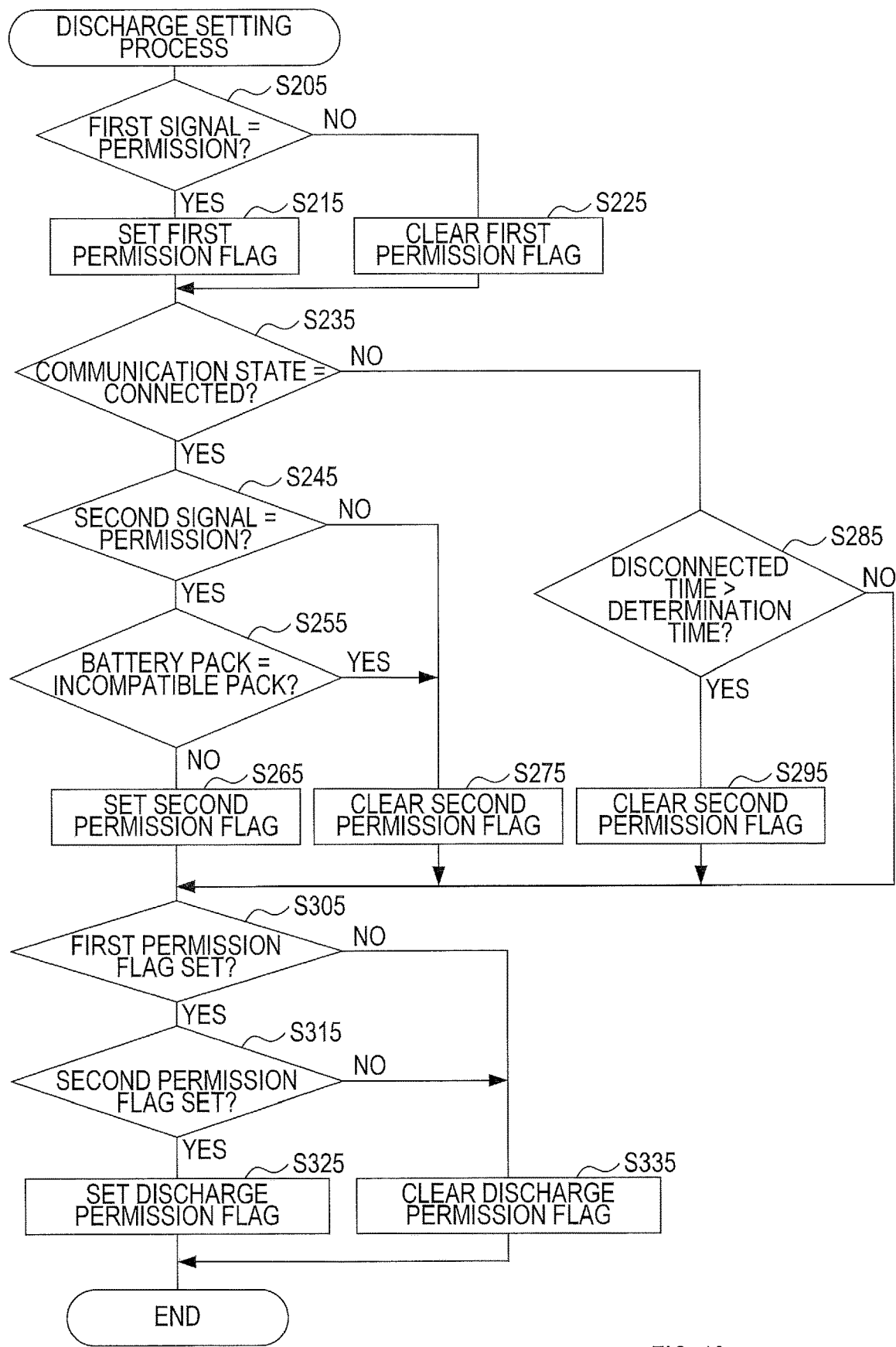
FIG. 10 is a flow chart showing a discharge setting process to be executed by the second control circuit according to the second embodiment.

Next, a discharge setting process to be executed by the second control circuit 36 in place of the flow chart of FIG. 6 is described with reference to the flow chart of FIG. 10.

In S205 through S245, the second control circuit 36 executes the processes same as those of S400 through S440.

In S255, the second control circuit 36 determines whether the battery pack 20 is the incompatible pack. Specifically, the second control circuit 36 obtains the battery data received through the second TR terminal 44. Then, the second control circuit 36 determines whether the pack model name included in the battery data is matched with any of the model names of the incompatible packs in the fourth data. Upon determination that the pack model name is matched with any of the model names of the incompatible packs (S255: YES), the second control circuit 36 proceeds to a process of S275. Upon determination that the pack model name is different from any of the model names of the incompatible packs (S225: NO), the second control circuit 36 proceeds to a process of S265.

In S265 through S335, the second control circuit 36 executes the processes same as those of S470 through S540.

If the battery pack 20 is the new battery pack, the fourth data does not include the pack model name of the battery pack 20 regardless of whether the battery pack 20 is the compatible pack or the incompatible pack. Therefore, the second control circuit 36 sets the second permission flag when the battery pack 20 is the new battery.

On the other hand, if the battery pack 20 is the new battery pack, the battery pack 20 appears after the electric work machine 1. Thus, the second data includes the work machine model name of the electric work machine 1 if the electric work machine 1 is the incompatible work machine. If the electric work machine 1 is the incompatible work machine, the electric work machine 1 receives the discharge prohibition signal from the battery pack 20 and forbids the discharge from the battery 60.

<2-3. Effects>

In the second embodiment detailed above, the above-described effect (1) of the first embodiment can be achieved, and furthermore, the following effects can be achieved.

(4) The second data does not include the work machine model name of a new electric work machine that appears after the storage of the second data in the first memory 65b. If the electric work machine 1 is the new electric work machine, the battery pack 20 may output the permission signal to the electric work machine 1 on the basis that second data does not include the work machine model name. However, the electric work machine 1 does not determine to allow the discharge when the electric work machine 1 is incompatible with the battery pack 20. Thus, if the new incompatible work machine is connected to the existing battery pack 20, it is possible to inhibit the new incompatible work machine from using the battery pack 20.

(5) The fourth data does not include the pack model name of the new battery pack that appears after the storage of the fourth data in the second memory 36b. The electric work machine 1 determines to allow the discharge from the battery pack 20 to the electric work machine 1 on the basis that the fourth data does not include the pack model name. However, if the battery pack 20 is incompatible with the electric work machine 1, the battery pack 20 outputs the discharge prohibition signal. Thus, when the existing electric work machine 1 is connected to the new incompatible pack, it is possible to inhibit the electric work machine 1 from using the new incompatible pack.

Third Embodiment

<3-1. Differences from First Embodiment>

The basic configuration of a third embodiment is similar to that of the first embodiment, and thus, only some differences are described hereinafter. The reference numerals same as those in the first embodiment indicate the same configurations and the preceding description is equally applied thereto.

The third embodiment is different from the first embodiment in that the first data is updated by the addition of the machine model name of the electric work machine 1 compatible with the battery pack 20, and the third data is updated by the addition of the pack model name of the battery pack 20 compatible with the electric work machine 1.

<3-2. Processes>

<3-2-1. Discharge Control Process>

Figure 11:
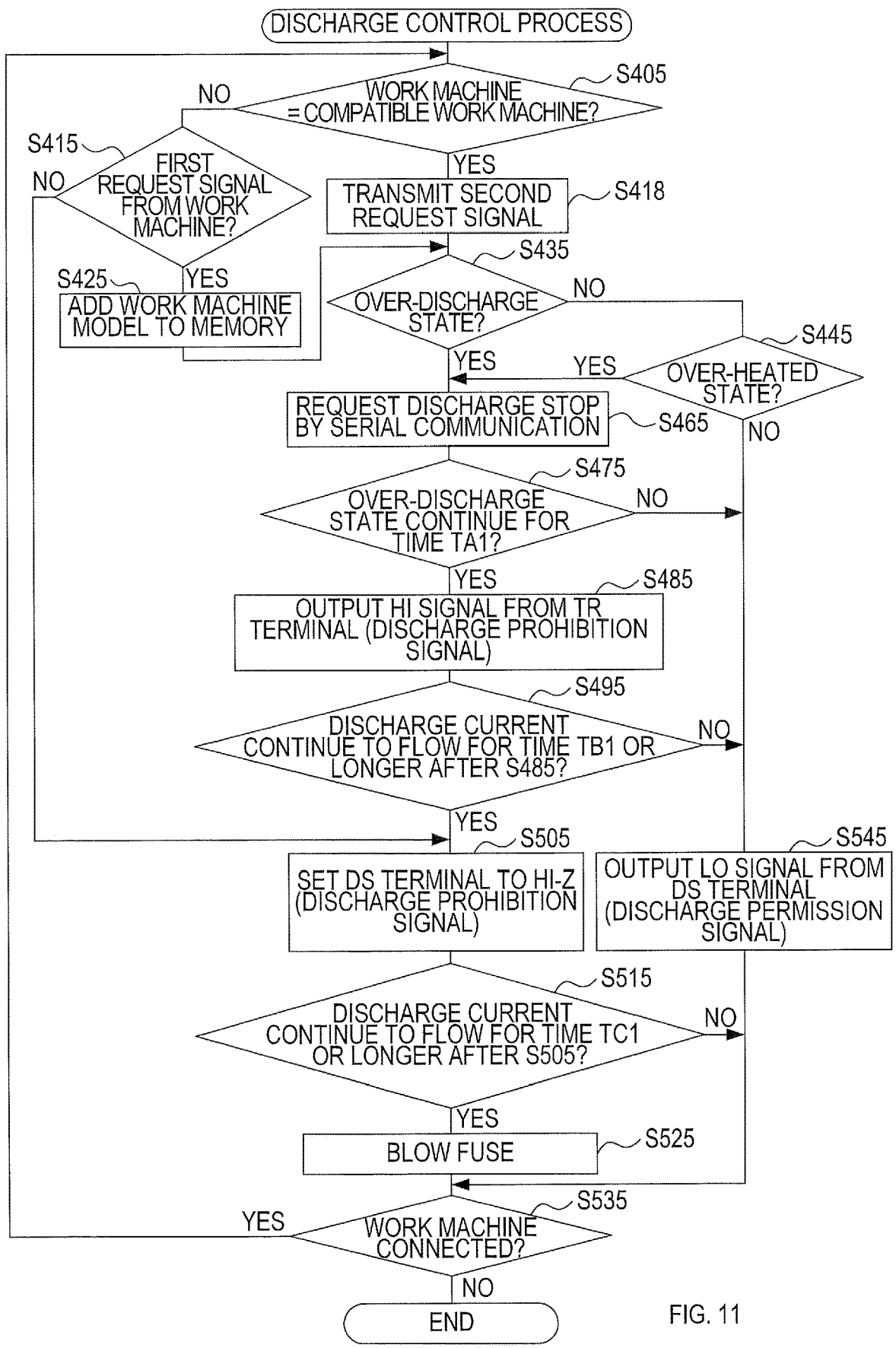
FIG. 11 is a flow chart showing a discharging control process to be executed by the first control circuit according to a third embodiment.

Next, a discharge control process to be executed by the first control circuit 65 in place of the flow chart of FIG. 3 is described with reference to the flow chart of FIG. 11.

In S405 and S415, the first control circuit 65 executes the same processes as those of S10 and S20.

Subsequently in S425, the first control circuit 65 adds the work machine model name obtained in S405 to the first data in the first memory 65b, thereby updating the first data.

In S418 and S435 through S535, the first control circuit 65 executes the same processes as those of S18 and S30 through S130.

<3-2-2. Discharge Setting Process>

Figure 12:
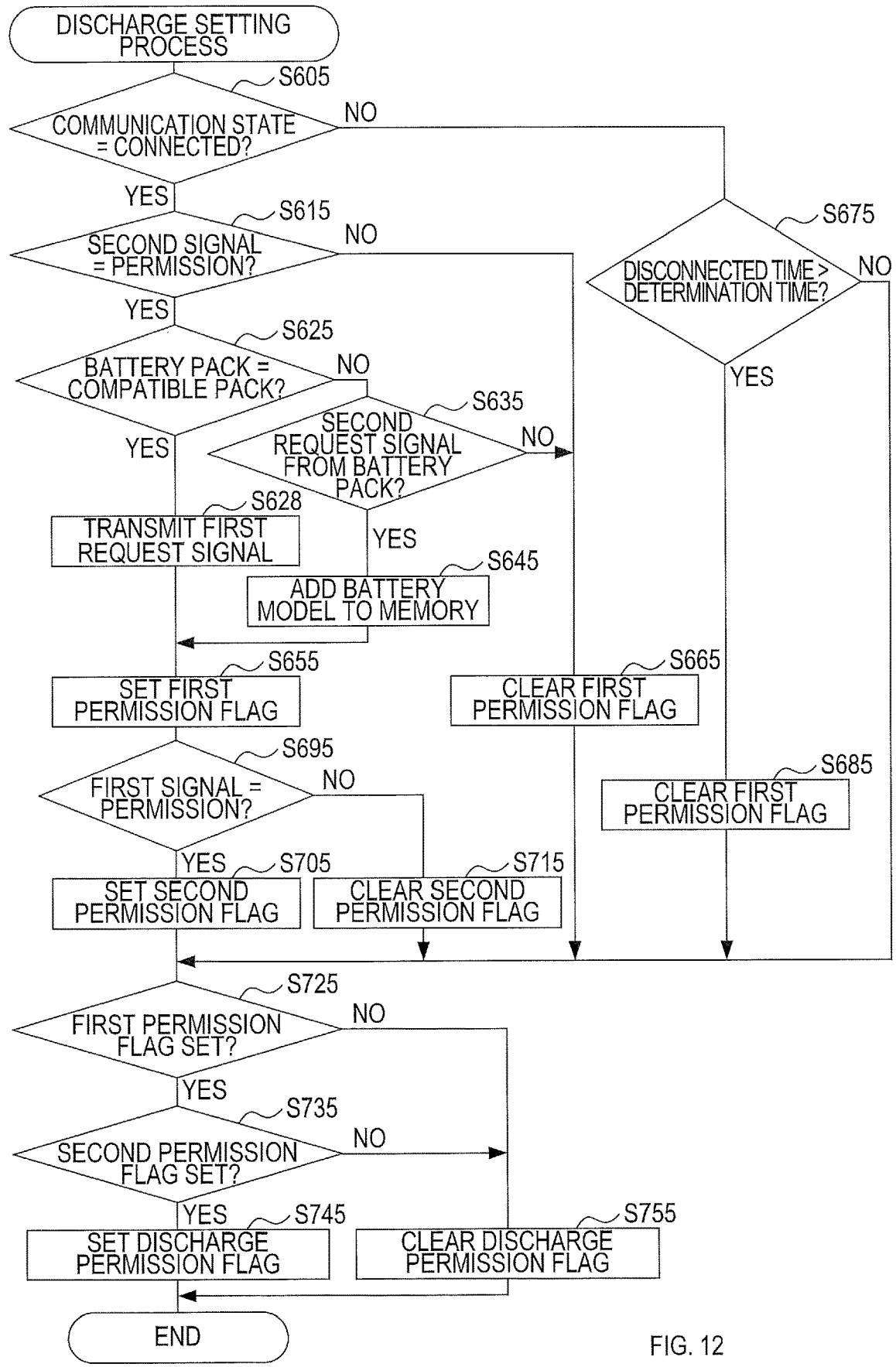
FIG. 12 is a flow chart showing a discharge setting process to be executed by the second control circuit according to the third embodiment.

Next, a discharge setting process to be executed by the second control circuit 36 in place of the flow chart of FIG. 6 is described with reference to the flow chart of FIG. 12.

First, in S605, the second control circuit 36 determines whether the communication state between the first control circuit 65 and the second control circuit 36 is in the connected state. Upon determination that the communication state is in the connected state (S605: YES), the second control circuit 36 proceeds to a process of S615. Upon determination that the communication state is in the disconnected state (S605: NO), the second control circuit 36 proceeds to a process of S675.

In S615, the second control circuit 36 determines whether the second signal received through the second TR terminal 44 is the discharge permission signal. Upon determination that the second signal is the discharge permission signal (S615: YES), the second control circuit 36 proceeds to a process of S625. Upon determination that the second signal is the discharge prohibition signal (S615: NO), the second control circuit 36 proceeds to a process of S665.

In S625, the second control circuit 36 determines whether the battery pack 20 is the compatible pack. Specifically, the second control circuit 36 obtains the battery data received through the second TR terminal 44. Then, the second control circuit 36 determines whether the pack model name included in the battery data is matched with any of the model names of the compatible packs in the third data. Upon determination that the pack model name is matched with any of the model names of the compatible packs (S625: YES), the second control circuit 36 proceeds to a process of S628 Upon determination that the pack model name is different from any of the model names of the compatible packs (S625: NO), the second control circuit 36 proceeds to a process of S635.

In S635, the second control circuit 36 determines whether the second control circuit 36 has received the second request signal from the battery pack 20 through the second TR terminal 44. Upon determination that the second control circuit 36 has received the second request signal (S635: YES), the second control circuit 36 proceeds to a process of S645. Upon determination that the second control circuit 36 has not received the second request signal (S635: NO), the second control circuit 36 proceeds to the process of S665.

In S645, the second control circuit 36 adds the pack model name obtained in S625 to the third data in the second memory 36b, thereby updating the third data.

In S628, the second control circuit 36 transmits the first request signal to the first control circuit 65 through the second TR terminal 44.

In S655, the second control circuit 36 sets the first permission flag and proceeds to a process of S695.

In S665, the second control circuit 36 clears the first permission flag and proceeds to a process of S725.

In S675, the second control circuit 36 determines whether the disconnected time is longer than the determination time. The disconnected time is the time during which the second control circuit 36 is not connected to the first control circuit 65. Upon determination that the disconnected time is longer than the determination time (S675: YES), the second control circuit 36 proceeds to the process of S685. Upon determination that the disconnected time is shorter than or equal to the determination time (S675: NO), the second control circuit 36 proceeds to a process of S725.

In S685, the second control circuit 36 clears the first permission flag and proceeds to the process of S725.

In S695, the second control circuit 36 determines whether the first signal received through the second DS terminal 43 is the discharge permission signal. Upon determination that the first signal is the discharge permission signal (S695: YES), the second control circuit 36 proceeds to a process of S705. Upon determination that the first signal is the discharge prohibition signal (S695: NO), the second control circuit 36 proceeds to a process of S715.

In S705, the second control circuit 36 sets the second permission flag and proceeds to the process of S725.

In S715, the second control circuit 36 clears the second permission flag and proceeds to the process of S725.

In S725 through S755, the second control circuit 36 executes the same processes as those of S510 through S540.

<3-3. Effects>

In the third embodiment detailed above, the above-described effects (1) through (3) of the first embodiment can be achieved, and furthermore, the following effects can be achieved.

(6) Based on the receipt of the first request signal, the first control circuit 65 adds the work machine model name of the electric work machine 1 to the first data, thereby updating the first data. This allows the first control circuit 65 to determine by itself whether the electric work machine 1 that appears after the battery pack 20 is compatible with the battery pack 20.

(7) In response to the receipt of the second request signal, the second control circuit 36 adds the pack model name of the battery pack 20 to the second data, thereby updating the second data. This allows the second control circuit 36 to determine by itself whether the battery pack 20 that appears after the electric work machine 1 is compatible with the electric work machine 1.

Other Embodiments

Some embodiments of the present disclosure have been described; however, the present disclosure may be embodied in various forms without being limited to the above-described embodiments.

(a) In the above described embodiments, the electric work machine 1 is a grass mower. However, the electric work machine 1 of the present disclosure is not limited to the grass mower. The electric work machine 1 may be gardening tools other than the grass mower, such as a hedge trimmer and a trimmer. The electric work machine 1 may also be electric power tools such as an impact driver and a circular saw. The electric work machine 1 is not specifically limited if it includes a motor and a tip tool driven by the power of the motor.

(b) In the above described embodiments, the second control circuit 36 turns on the switching element 55 when the discharge permission flag is set, and the second control circuit 36 turns off the switching element 55 when the discharge permission flag is cleared. However, the present disclosure is not limited to this configuration. In the case where the discharge permission flag is not set, the second control circuit 36 may forbid the discharge from the battery pack 20 to the electric work machine 1 by (i) turning on the switching element 55 and (ii) turning off all of the switching elements Q1 through Q6. That is, one example of the switching element of the present disclosure may be the switching elements Q1 through Q6. In the case where the discharge permission flag is set, the control circuit 36 may turn on at least one of the switching elements Q1 through Q6. In the case where the discharge permission flag is cleared, the control circuit 36 may turn off all of the switching elements Q1 through Q6.

(c) In place of or in addition to the microcomputer, the first control circuit 65 and the second control circuit 36 may include a combination of individual various electronic components, Application Specified Integrated Circuit (ASIC), Application Specific Standard Product (ASSP), a programmable logic device such as Field Programmable Gate Array (FPGA), and a combination thereof.

(d) A plurality of functions of one element of the aforementioned embodiments may be performed by a plurality of elements, and one function of one element may be performed by a plurality of elements. Furthermore, a plurality of functions of a plurality of elements may be performed by one element, and one function performed by a plurality of elements may be performed by one element. A part of the configurations of the aforementioned embodiments may be omitted. Furthermore, at least part of the configurations of the aforementioned embodiments may be added to or replaced with the configurations of the other above-described embodiments.

What is claimed is:

1. A system comprising:
a battery pack including:
a battery;
a first interface (i) including a first positive terminal, a first negative terminal, and a first communication terminal and (ii) configured to be alternatively connected to a first type electric apparatus or a second type electric apparatus;
a first memory storing first data and/or second data, the first data identifying the first type electric apparatus, the second data identifying the second type electric apparatus, the first type electric apparatus being compatible with the battery pack, the second type electric apparatus being incompatible with the battery pack; and
a first controller configured to:
transmit battery data from the first communication terminal, the battery data identifying a type of the battery pack;
receive electric apparatus data from the first communication terminal, the electric apparatus data identifying a type of an electric apparatus connected to the first interface;
transmit a permission signal from the first communication terminal at least based on (i) the first data including the type of the electric apparatus identified by the electric apparatus data, or (ii) the second data excluding the type of the electric apparatus identified by the electric apparatus data, the permission signal allowing the electric apparatus connected to the first interface to receive a discharge from the battery; and
transmit a prohibition signal from the first communication terminal based on (i) the first data excluding the type of the electric apparatus identified by the electric apparatus data, or (ii) the second data including the type of the electric apparatus identified by the electric apparatus data, the prohibition signal forbidding the electric apparatus connected to the first interface to receive the discharge from the battery,
an electric work machine including:
a motor configured to receive an electric power to thereby rotate,
a second interface (i) including a second positive terminal, a second negative terminal, and a second communication terminal and (ii) configured to be connected to the first interface;
a current path configured to electrically connect the second positive terminal or the second negative terminal to the motor;
a switching element on the current path;
a manual switch configured to be manually operated by a user;
a second memory storing third data and/or fourth data, the third data identifying a first type battery pack, the fourth data identifying a second type battery pack, the first type battery pack being compatible with the electric work machine, the second type battery pack being incompatible with the electric work machine; and
a second controller configured to:
transmit the electric apparatus data from the second communication terminal;
receive the battery data from the second communication terminal;
determine to allow the battery pack connected to the second interface to discharge to the electric work machine based on (i) the third data including the type of the battery pack identified by the battery data, or (ii) the fourth data excluding the type of the battery pack identified by the battery data;

turn on the switching element based on (i) the second controller having determined to allow the discharge, and (ii) the second controller having received the permission signal from the second communication terminal, and (iii) the manual switch having been or being manually operated; and turn off the switching element based on (i) the second controller having not determined to allow the discharge or (ii) the second controller having received the prohibition signal from the second communication terminal.

2. The system according to claim 1,
wherein the first memory stores the second data.
3. The system according to claim 1,
wherein the second memory stores the fourth data.
4. The system according to claim 1,
wherein the second memory stores the third data.
5. The system according to claim 4,
wherein the second controller is configured to transmit a first request signal from the second communication terminal based on the third data including the type of the battery pack identified by the battery data, the first request signal requesting the battery pack connected to the second interface to allow the discharge, and
wherein the first controller is configured to transmit the permission signal from the first communication terminal based on the first controller having received the first request signal from the first communication terminal.

6. The system according to claim 1,
wherein the first memory stores the first data.
7. The system according to claim 6,
wherein the first controller is configured to transmit a second request signal from the first communication terminal based on the first data including the type of the electric apparatus identified by the electric apparatus data, the second request signal requesting the electric apparatus connected to the first interface to allow the discharge, and
wherein the second controller is configured to determine to allow the discharge based on the second controller having received the second request signal from the second communication terminal.

8. The system according to claim 1,
wherein the battery pack further includes:
a voltage detector configured to detect a battery voltage value, the battery voltage value corresponding to a magnitude of an output voltage of the battery; and
a temperature detector configured to detect a battery temperature, and
wherein the first controller is configured to:
determine whether the battery is dischargeable based on the battery voltage value detected by the voltage detector and/or the battery temperature detected by the temperature detector; and
transmit the permission signal from the first communication terminal based on (i) the first data including the type of the electric apparatus identified by the electric apparatus data, or (ii) the second data excluding the type of the electric apparatus identified by the electric apparatus data, and (iii) the first controller having determined that the battery is dischargeable.

9. A battery pack comprising:
a battery;
an interface (i) including a positive terminal, a negative terminal, and a communication terminal and (ii) configured to be alternatively connected to a first type electric work machine or a second type electric work machine;
a memory storing first data and/or second data, the first data identifying the first type electric work machine, the second data identifying the second type electric work machine, the first type electric work machine being compatible with the battery pack, the second type electric work machine being incompatible with the battery pack; and
a controller configured to:
transmit battery data from the communication terminal, the battery data identifying a type of the battery pack;
receive work machine data from the communication terminal, the work machine data identifying a type of an electric work machine connected to the interface;
transmit a permission signal from the communication terminal at least based on (i) the first data including the type of the electric work machine identified by the work machine data, or (ii) the second data excluding the type of the electric work machine identified by the work machine data, the permission signal allowing the electric work machine connected to the interface to receive a discharge from the battery; and
transmit a prohibition signal from the communication terminal based on (i) the first data excluding the type of the electric work machine identified by the work machine data, or (ii) the second data including the type of the electric work machine identified by the work machine data, the prohibition signal forbidding the electric work machine connected to the interface to receive the discharge from the battery.

10. The battery pack according to claim 9,
wherein the memory stores the second data.
11. The battery pack according to claim 9,
wherein the memory stores the first data.
12. The battery pack according to claim 11,
wherein the controller is configured to transmit a request signal from the communication terminal based on the first data including the type of the electric work machine identified by the work machine data, the request signal requesting the electric work machine connected to the interface to allow the discharge.

13. An electric work machine comprising:
an interface (i) including a positive terminal, a negative terminal, and a communication terminal, and (ii) configured to be alternatively connected to a first type battery pack or a second type battery pack;
a motor configured to receive an electric power to thereby rotate;
a current path configured to electrically connect the positive terminal or the negative terminal to the motor;
a switching element on the current path;
a manual switch configured to be manually operated by a user;
a memory storing first data and/or second data, the first data identifying a first type battery pack, the second data identifying a second type battery pack, the first type battery pack being compatible with the electric work machine, the second type battery pack being incompatible with the electric work machine; and
a controller configured to:
transmit work machine data from the communication terminal, the work machine data identifying a type of the electric work machine;

receive battery data from the communication terminal, the battery data identifying a type of a battery pack connected to the interface;

determine to allow the battery pack connected to the interface to discharge to the electric work machine based on (i) the first data including the type of the battery pack identified by the battery data, or (ii) the second data excluding the type of the battery pack identified by the battery data;

turn on the switching element based on (i) the controller having determined to allow a discharge, and (ii) the controller having received a permission signal from the communication terminal, and (iii) the manual switch having been or being manually operated, the permission signal being transmitted from the battery pack connected to the interface in response to the battery pack allowing the discharge; and turn off the switching element based on (i) the controller having not determined to allow the discharge or (ii) the controller having received a prohibition signal from the communication terminal, the prohibition signal being transmitted from the battery pack connected to the interface in response to the battery pack forbidding the discharge.

14. The electric work machine according to claim 13, wherein the memory stores the second data.

15. The electric work machine according to claim 13, wherein the memory stores the first data.

16. The electric work machine according to claim 15, wherein the controller is configured to transmit a request signal from the communication terminal based on the first data including the type of the battery pack identified by the battery data, the request signal requesting the battery pack connected to the interface to allow the discharge.

* * * * *